(12) United States Patent
Hicks

(10) Patent No.: US 11,692,482 B2
(45) Date of Patent: Jul. 4, 2023

(54) ROLLER BEARING ARRANGEMENT FOR A GAS TURBINE ENGINE

(71) Applicant: ROLLS-ROYCE plc, London (GB)

(72) Inventor: Robert W Hicks, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/812,563

(22) Filed: Jul. 14, 2022

(65) Prior Publication Data

US 2023/0026221 A1 Jan. 26, 2023

(30) Foreign Application Priority Data

Jul. 21, 2021 (GB) ...................................... 2110451

(51) Int. Cl.
*F02C 7/06* (2006.01)
*F02C 7/36* (2006.01)
*F01D 21/04* (2006.01)

(52) U.S. Cl.
CPC .............. *F02C 7/06* (2013.01); *F01D 21/045* (2013.01); *F02C 7/36* (2013.01); *F05D 2220/323* (2013.01); *F05D 2220/36* (2013.01); *F05D 2240/54* (2013.01); *F05D 2260/37* (2013.01); *F05D 2260/98* (2013.01)

(58) Field of Classification Search
CPC .... F02C 7/06; F02C 7/36; F01D 25/16; F01D 25/162; F01D 25/164; F01D 21/045; F05D 2240/54; F16C 35/073
See application file for complete search history.

(56) References Cited

U.S. PATENT DOCUMENTS

| 4,159,888 A | * | 7/1979 | Thompson | F01D 25/18 |
| | | | | 415/105 |
| 4,306,755 A | * | 12/1981 | Roberts | F01D 5/026 |
| | | | | 384/494 |
| 6,082,959 A | * | 7/2000 | Van Duyn | F01D 25/16 |
| | | | | 415/174.4 |

(Continued)

FOREIGN PATENT DOCUMENTS

| CN | 206468447 U | * | 9/2017 | |
| CN | 110748419 B | * | 6/2021 | ............... F02C 7/06 |

(Continued)

OTHER PUBLICATIONS

Jan. 5, 2023 extended Search Report issued in European Patent Application No. 22181134.2.

*Primary Examiner* — Topaz L. Elliott
(74) *Attorney, Agent, or Firm* — Oliff PLC

(57) ABSTRACT

A roller bearing arrangement for a gas turbine engine. The roller bearing arrangement includes a fan shaft, and a stub shaft connected to the fan shaft. The roller bearing arrangement further includes a plurality of roller bearing elements positioned between a first axial bearing surface created on a radially outer surface of the stub shaft and a second axial bearing surface of a static structure, the roller bearing arrangement further including a first snubber positioned between the radially outer surface of the fan shaft and a radially inner surface of the stub shaft, the first snubber being spaced apart from the radially inner surface of the stub shaft or the radially outer surface of the fan shaft so as to limit a radial movement range of the stub shaft.

13 Claims, 17 Drawing Sheets

(56) References Cited

U.S. PATENT DOCUMENTS

| | | | | |
|---|---|---|---|---|
| 7,448,845 | B2* | 11/2008 | Stephenson | F02K 3/06 415/174.4 |
| 7,634,913 | B2* | 12/2009 | Singh | F16C 19/52 340/870.07 |
| 9,316,231 | B2* | 4/2016 | Simms | F04D 27/0292 |
| 9,797,407 | B2* | 10/2017 | Burghardt | F01D 25/16 |
| 10,174,634 | B2* | 1/2019 | Pikovsky | F16C 33/6677 |
| 2003/0210979 | A1* | 11/2003 | Doerflein | F16C 23/084 415/1 |
| 2006/0218935 | A1* | 10/2006 | Singh | F01D 25/162 60/803 |
| 2006/0269391 | A1* | 11/2006 | Stephenson | F01D 25/162 415/9 |
| 2008/0063333 | A1 | 3/2008 | Bruno et al. | |
| 2013/0058775 | A1* | 3/2013 | Simms | F04D 29/043 415/208.1 |
| 2013/0108440 | A1 | 5/2013 | Do et al. | |
| 2015/0016994 | A1* | 1/2015 | Burghardt | F04D 13/02 415/229 |
| 2015/0247454 | A1* | 9/2015 | Laureano | F02C 7/06 415/60 |
| 2015/0343573 | A1* | 12/2015 | Albert | B23P 6/002 29/898.08 |
| 2016/0097301 | A1* | 4/2016 | Rosenau | F01D 25/164 415/119 |
| 2016/0130975 | A1* | 5/2016 | Chilton | F01D 25/162 415/9 |
| 2016/0131034 | A1* | 5/2016 | Chilton | F16C 33/6681 184/6.11 |
| 2017/0145857 | A1* | 5/2017 | Pikovsky | F01M 11/02 |
| 2018/0112672 | A1* | 4/2018 | Ganiger | F16C 19/06 |
| 2018/0266276 | A1* | 9/2018 | Phillips | F01D 25/164 |
| 2020/0095931 | A1* | 3/2020 | Vinski | F02C 3/08 |
| 2020/0157971 | A1* | 5/2020 | Buchholz | F16C 19/522 |
| 2020/0224554 | A1 | 7/2020 | Maguire et al. | |
| 2022/0260020 | A1* | 8/2022 | Buchholz | F02C 7/06 |

FOREIGN PATENT DOCUMENTS

| | | | | |
|---|---|---|---|---|
| CN | 114215851 | A * | 3/2022 | |
| EP | 2 824 288 | A1 | 1/2015 | |
| EP | 3 006 680 | A1 | 4/2016 | |
| FR | 3 022 587 | A1 | 12/2015 | |
| GB | 2 005 774 | A | 4/1979 | |
| GB | 2114266 | A * | 8/1983 | F01D 21/045 |
| GB | 2424681 | A | 4/2006 | |
| WO | WO-2020260258 | A1 * | 12/2020 | F01D 15/12 |

* cited by examiner

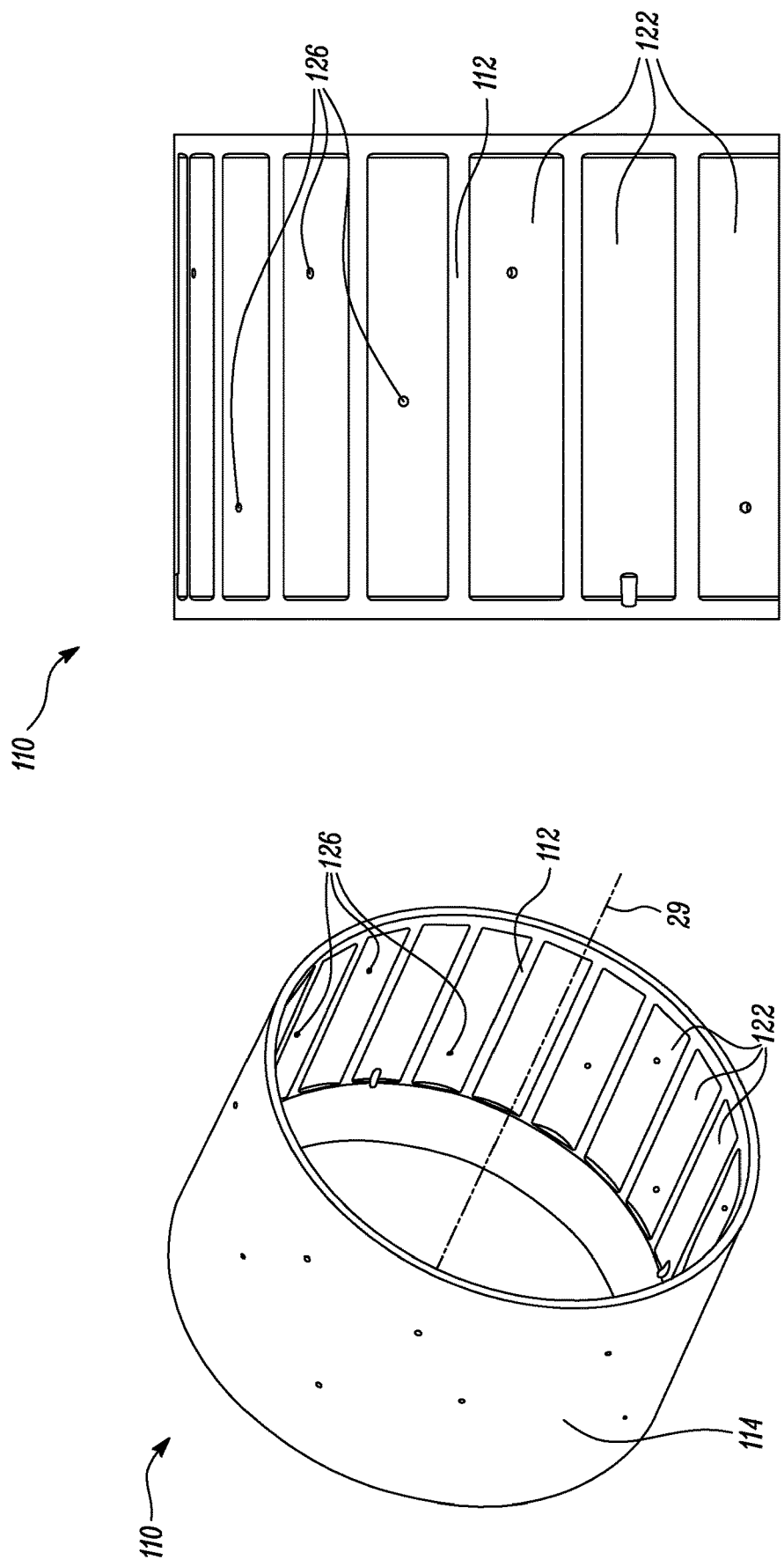

ROLLER BEARING ARRANGEMENT FOR A GAS TURBINE ENGINE

CROSS-REFERENCE TO RELATED APPLICATIONS

This application claims priority pursuant to 35 U.S.C. 119(a) to from United Kingdom patent Application No. 2110451.8, filed Jul. 21, 2021, which application is incorporated herein by reference in its entirety.

BACKGROUND

The present disclosure relates to a roller bearing arrangement, and in particular to a roller bearing arrangement for a gas turbine engine.

The trend towards more fuel-efficient and environmentally friendly engines has led to an increase in the diameter of fans and fan blades. However, the diameter of the fan is constrained by the space available on the airframe between the wing and the ground. This leads to a design challenge, whereby it is desirable to increase the diameter of the fan whilst minimizing the increase of the diameter of the engine.

A gas turbine engine generally includes a roller bearing arrangement including a plurality of roller bearing elements for transferring loads from a fan shaft to a static structure of the gas turbine engine. In some cases, the roller bearing arrangement may include a stub shaft connected to the fan shaft and positioned radially between the plurality of roller bearing elements and the fan shaft.

In conventional roller bearing assemblies, the stub shaft may be connected to the fan shaft by an interference fit that is axially aligned with the plurality of roller bearing elements. The interference fit in such conventional roller bearing assemblies may be axially aligned with the plurality of roller bearing elements in order to enable the conventional roller bearing assemblies to withstand ultimate loads from the fan shaft due to a failure event (e.g., a fan blade-off event). However, such conventional roller bearing assemblies may require the fan shaft and the stub shaft to have large diameters in order to withstand the ultimate loads. Also, if the interference fit of the stub shaft is axially aligned with the plurality of roller bearing elements, it becomes difficult to deliver lubrication to the stub shaft, meaning further radial space is required to allow room for an lubrication distribution system to deliver oil to the interior surface of the stub shaft. Therefore, the conventional roller bearing assemblies may be large, space consuming, and heavy, due to the large diameters of the fan shaft and the stub shaft, thus limiting the space available for larger, more efficient fan blades.

SUMMARY OF THE DISCLOSURE

According to a first aspect, there is provided a roller bearing arrangement for a gas turbine engine. The roller bearing arrangement includes a fan shaft, a stub shaft, a static structure, a plurality of roller bearing elements, and a first snubber. The fan shaft defines an axis of rotation. The stub shaft is connected to the fan shaft and extends radially away therefrom so as to create a first axial bearing surface on a radially outer surface of the stub shaft. The first axial bearing surface is parallel with the axis of rotation and at a greater radial distance from the axis of rotation than a radially outer surface of the fan shaft. The static structure has a second axial bearing surface parallel with and opposite to the first axial bearing surface. The plurality of roller bearing elements is positioned between the first axial bearing surface and the second axial bearing surface. The first snubber is positioned between the radially outer surface of the fan shaft and a radially inner surface of the stub shaft. The first snubber is spaced apart from the radially inner surface of the stub shaft or the radially outer surface of the fan shaft so as to limit a radial movement range of the stub shaft.

The roller bearing arrangement may be compact and lightweight while being capable of transferring loads from the fan shaft to the static structure. Furthermore, the roller bearing arrangement may be capable of withstanding ultimate loads from the fan shaft due to a failure event (e.g., a fan blade-off event). Such a roller bearing arrangement takes up less radial space than known arrangements, allowing for an increase in fan blade/fan diameter whilst minimising the increase in the overall diameter of the engine.

Further, the stub shaft may be designed to independently withstand normal running loads. When the stub shaft is subjected to the ultimate loads by the fan shaft, the first snubber may provide a secondary load path and additional support to the stub shaft. The secondary load path may limit a maximum stress experienced by the stub shaft to an acceptable level. In other words, the stub shaft may not need to be designed to independently withstand the ultimate loads. Thus, the stub shaft may be designed to be lightweight and compact, thereby reducing a weight of the gas turbine engine.

As discussed above, the first snubber may provide additional support to the stub shaft when the stub shaft is subjected to the ultimate loads. This may allow a design of the fan shaft that is capable of withstanding the ultimate loads with a smaller diameter. Thus, the fan shaft may be designed to be lightweight and compact, thereby further Reducing the weight of the gas turbine engine.

In some embodiments, the stub shaft is connected to the fan shaft via an interference fit.

The interference fit may be a diametrical interference fit that may be a simple, low-cost, low-weight, and an accurate means of connecting the stub shaft to the fan shaft.

In some embodiments, the first axial bearing surface is axially spaced apart from the interference fit.

The first axial bearing surface being axially spaced apart from the interference fit may reduce deformation or coning of raceway surfaces of the plurality of roller bearing elements. This may result in an even load distribution across the plurality of roller bearing elements and a reduction of a peak stress experienced by the plurality of roller bearing elements. Furthermore, the first axial bearing surface being axially spaced apart from the interference fit may facilitate lubrication of the plurality of roller bearing elements.

In some embodiments, the first snubber is an extension of the fan shaft extending radially outward towards the radially inner surface of the stub shaft.

In some embodiments, the first snubber is an extension of the stub shaft extending radially inward towards the radially outer surface of the fan shaft.

In some embodiments, the first snubber is an extension of an output shaft from a power gear box extending radially outward towards the radially inner surface of the stub shaft.

In some embodiments, the output shaft is in contact with the radially outer surface of the fan shaft opposite to the first snubber.

Therefore, in some cases, the fan shaft may provide additional support to the output shaft including the first snubber.

In some embodiments, the first snubber is axially aligned with the plurality of roller bearing elements.

Therefore, the first snubber may provide the secondary load path that is axially aligned with the plurality of roller bearing elements. This may further prevent coning of the raceway surfaces of the plurality of roller bearing elements.

In some embodiments, the roller bearing arrangement includes the second snubber being at an axially distinct position from the first snubber.

In some embodiments, the second snubber is an extension of the fan shaft extending radially outward towards the radially inner surface of the stub shaft.

In some embodiments, the second snubber is an extension of the stub shaft extending radially inward towards the radially outer surface of the fan shaft.

In some embodiments, the second snubber is an extension of an output shaft from a power gear box extending radially outward towards the radially inner surface of the stub shaft.

In some embodiments, the second snubber is a continuous extension having a circumferential extent of 360 degrees.

In some embodiments, the second snubber includes a plurality of second snubber segments circumferentially spaced apart from each other.

In some embodiments, the first axial bearing surface is axially located between the plurality of roller bearing elements.

In some embodiments, the first snubber is a continuous extension having a circumferential extent of 360 degrees.

In some embodiments, the first snubber includes a plurality of first snubber segments circumferentially spaced apart from each other.

In some embodiments, the roller bearing arrangement includes an inner race at least partially disposed on the first axial bearing surface and an outer race at least partially disposed on the second axial bearing surface. The plurality of roller bearing elements is at least partially received between the inner race and the outer race.

The roller bearing arrangement may reduce deformation or coning of the inner race and the outer race. Therefore, the roller bearing arrangement may provide an even load distribution across the plurality of roller bearing elements and a reduction of a peak stress experienced by the plurality of roller bearing elements.

In some embodiments, the stub shaft includes a plurality of scallops on the radially inner surface of the stub shaft and a plurality of channels fluidly communicating the plurality of scallops with the first axial bearing surface. Each scallop is configured receive a lubricant from a lubricant supply. Each channel is configured to supply the lubricant to the first axial bearing surface.

Therefore, the plurality of scallops and the plurality of channels may effectively lubricate and cool the plurality of roller bearing elements.

According to a second aspect, there is provided a gas turbine engine for an aircraft. The gas turbine engine includes the roller bearing arrangement of the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e., the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e., the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e., the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e., the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass passage to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass passage may be substantially annular. The bypass passage may be radially outside the engine core. The radially outer surface of the bypass passage may be defined by a nacelle and/or a fan case.

The overall pressure ratio of a gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e., the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e., the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e., the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice, or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass passage to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions, and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 5A is a schematic perspective view of a portion of a stub shaft of the roller bearing arrangement according to an embodiment of the present disclosure;

FIG. 5B is a schematic side view of a portion of the stub shaft of FIG. 5A showing a radially inner surface of the stub shaft;

DETAILED DESCRIPTION OF THE DISCLOSURE

Aspects and embodiments of the present disclosure will now be discussed with reference to the accompanying figures. Further aspects and embodiments will be apparent to those skilled in the art.

As used herein, a component extends "axially" relative to an axis if the component extends along the axis. A component extends "circumferentially" relative to an axis if the component extends in a circumferential direction defined around the axis. A component extends "radially" relative to an axis if the component extends radially inward or outward relative to the axis.

As used herein, the term "axis of rotation" refers to a straight line around which a component performs, at least in working condition, rotation and/or revolution.

As used herein, "a radially inner surface" and "a radially outer surface" of a component may be defined as an innermost, circumferentially extending surface and an outermost, circumferentially extending surface of the component, respectively, relative to the axis of rotation.

Figure 1:
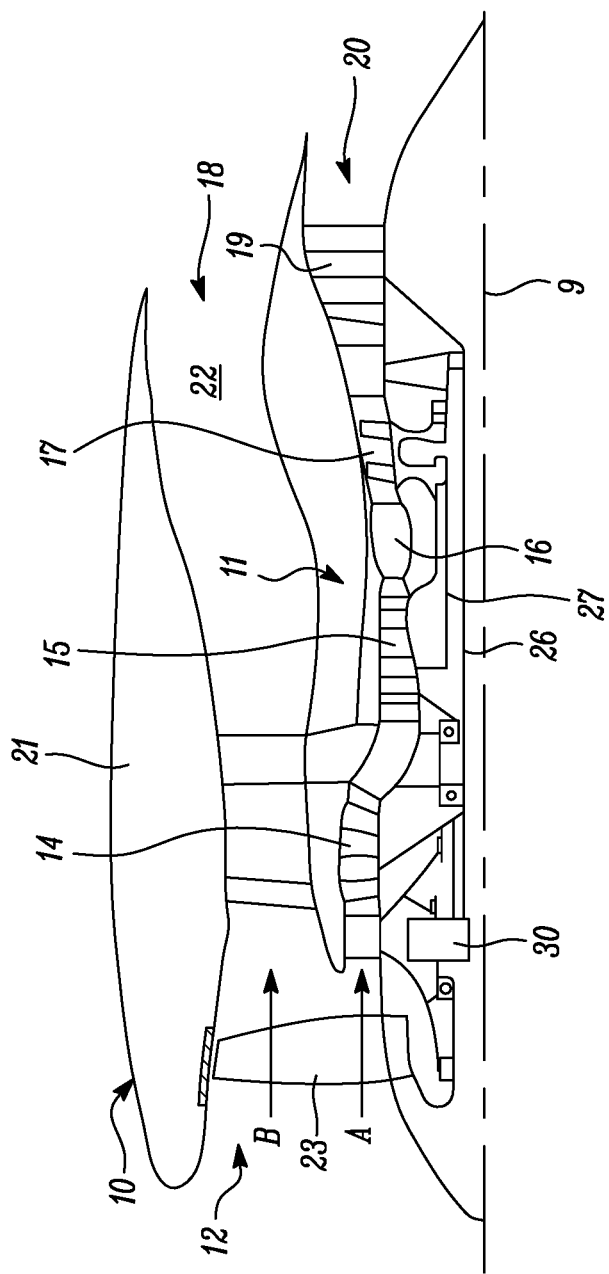
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, a combustor section 16, a high-pressure turbine 17, a low-pressure turbine 19 and a core exhaust nozzle 20. A nacelle 21 surrounds the gas turbine engine 10 and defines a bypass passage 22 and a bypass exhaust nozzle 18. The bypass airflow B flows through the bypass passage 22. The propulsive fan 23 is attached to and driven by the low-pressure turbine 19 via a shaft 26 (interchangeably referred to as a fan shaft 26, or an input shaft 26) and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustor section 16 where it is mixed with fuel and the mixture is combusted. The resultant hot combustion products then expand through, and thereby drive, the high-pressure and low-pressure turbines 17, 19 before being exhausted through the core exhaust nozzle 20 to provide some propulsive thrust. The high-pressure turbine 17 drives the high-pressure compressor 15 by a suitable interconnecting shaft 27. The propulsive fan 23 generally provides the majority of the propulsive thrust. The epicyclic gearbox 30 is a reduction gearbox.

Figure 2:
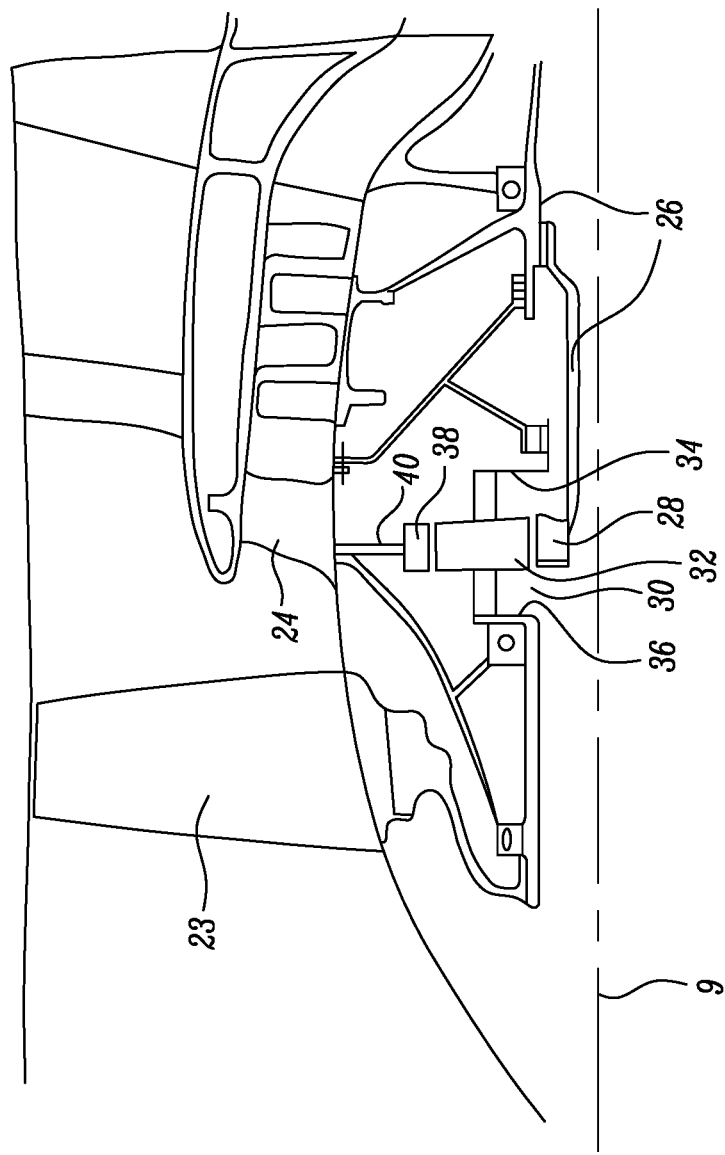
FIG. 2 is a close up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the propulsive fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low-pressure turbine" and "low-pressure compressor" as used herein may be taken to mean the lowest pressure turbine stages and lowest pressure compressor stages (i.e., not including the propulsive fan 23) respectively and/or the turbine and compressor stages that are connected together by the interconnecting shaft 26 with the lowest rotational speed in the engine (i.e., not including the gearbox output shaft that drives the propulsive fan 23). In some literature, the "low-pressure turbine" and "low-pressure compressor" referred to herein may alternatively be known as the "intermediate pressure turbine" and "intermediate pressure compressor". Where such alternative nomenclature is used, the propulsive fan 23 may be referred to as a first, or lowest pressure, compression stage.

Figure 3:
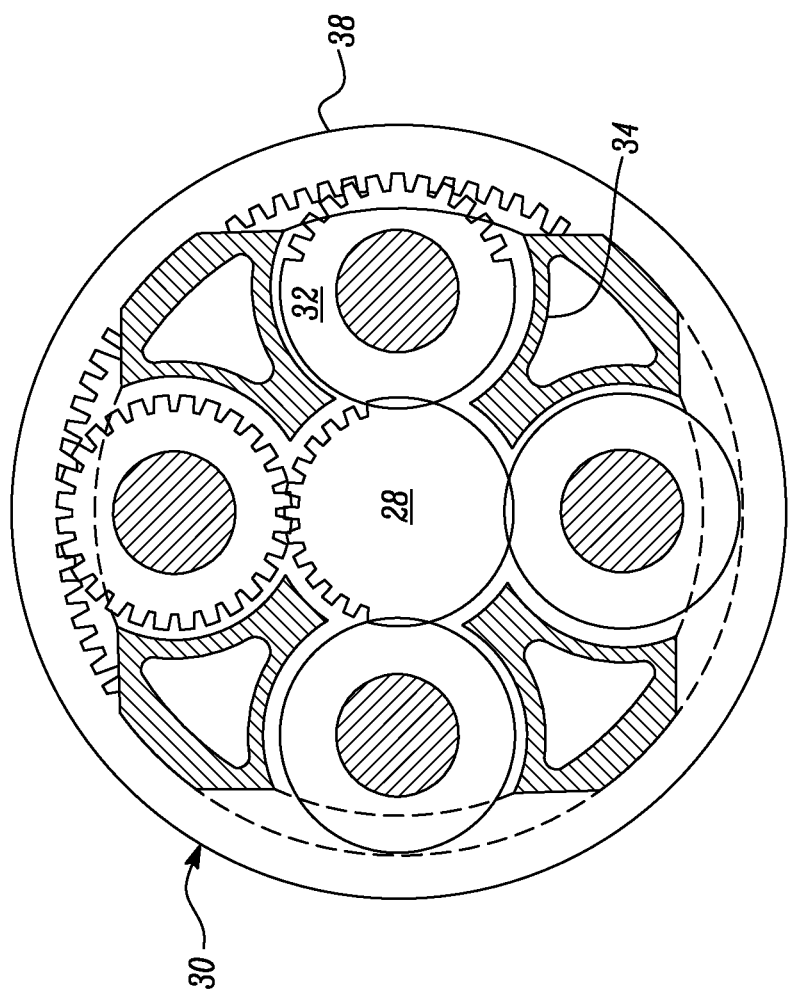
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the propulsive fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input, and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass passage 22 has its own nozzle 18 that is separate to and radially outside the core exhaust nozzle 20. However, this is not limiting, and any aspect of the present disclosure may also apply to engines in which the flow through the bypass passage 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present disclosure is equally applicable to aero gas turbine engines, marine gas turbine engines and land-based gas turbine engines.

Figure 4A:
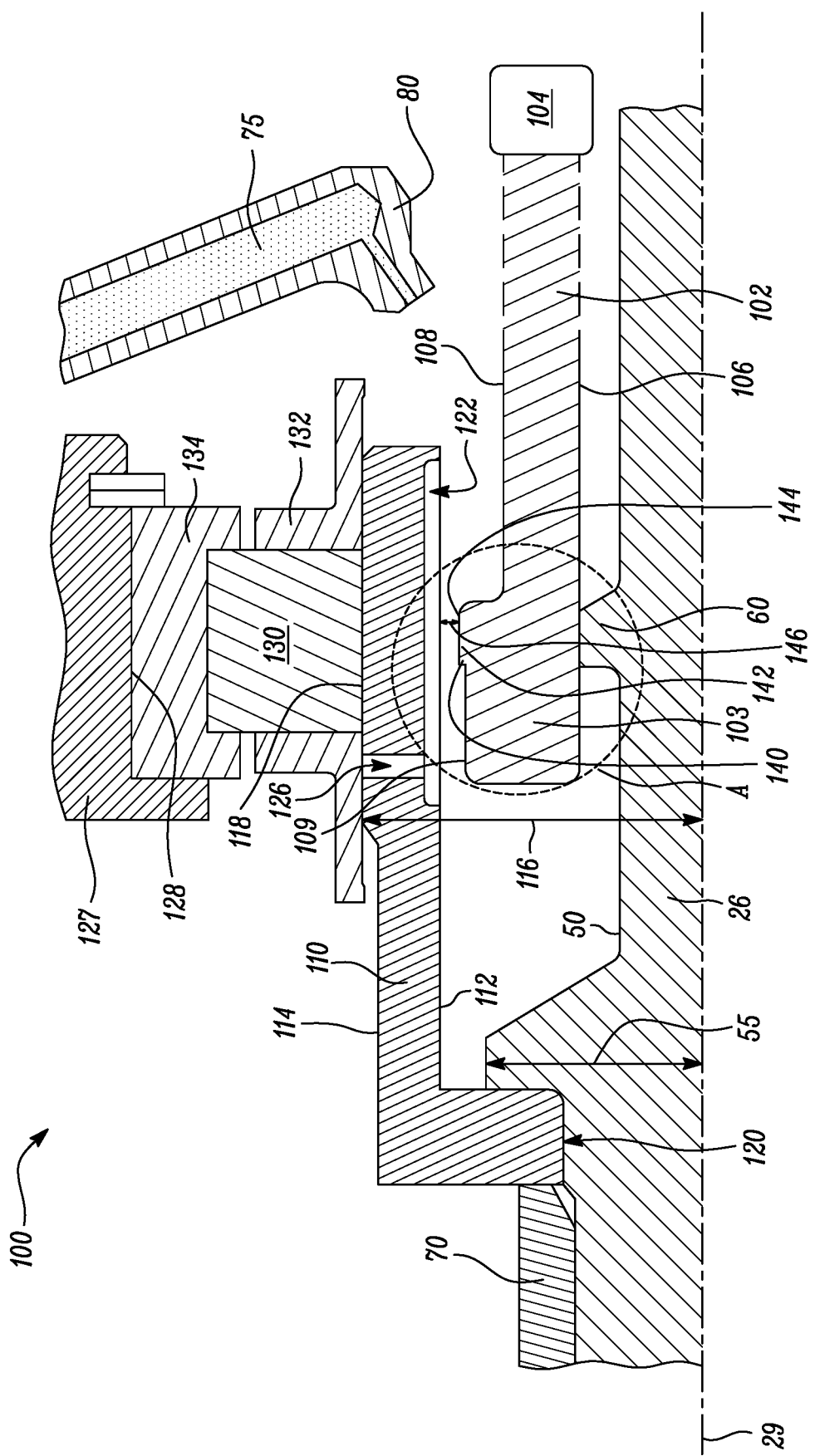
FIG. 4A is a sectional side view of a roller bearing arrangement according to an embodiment of the present disclosure.
Figure 4B:
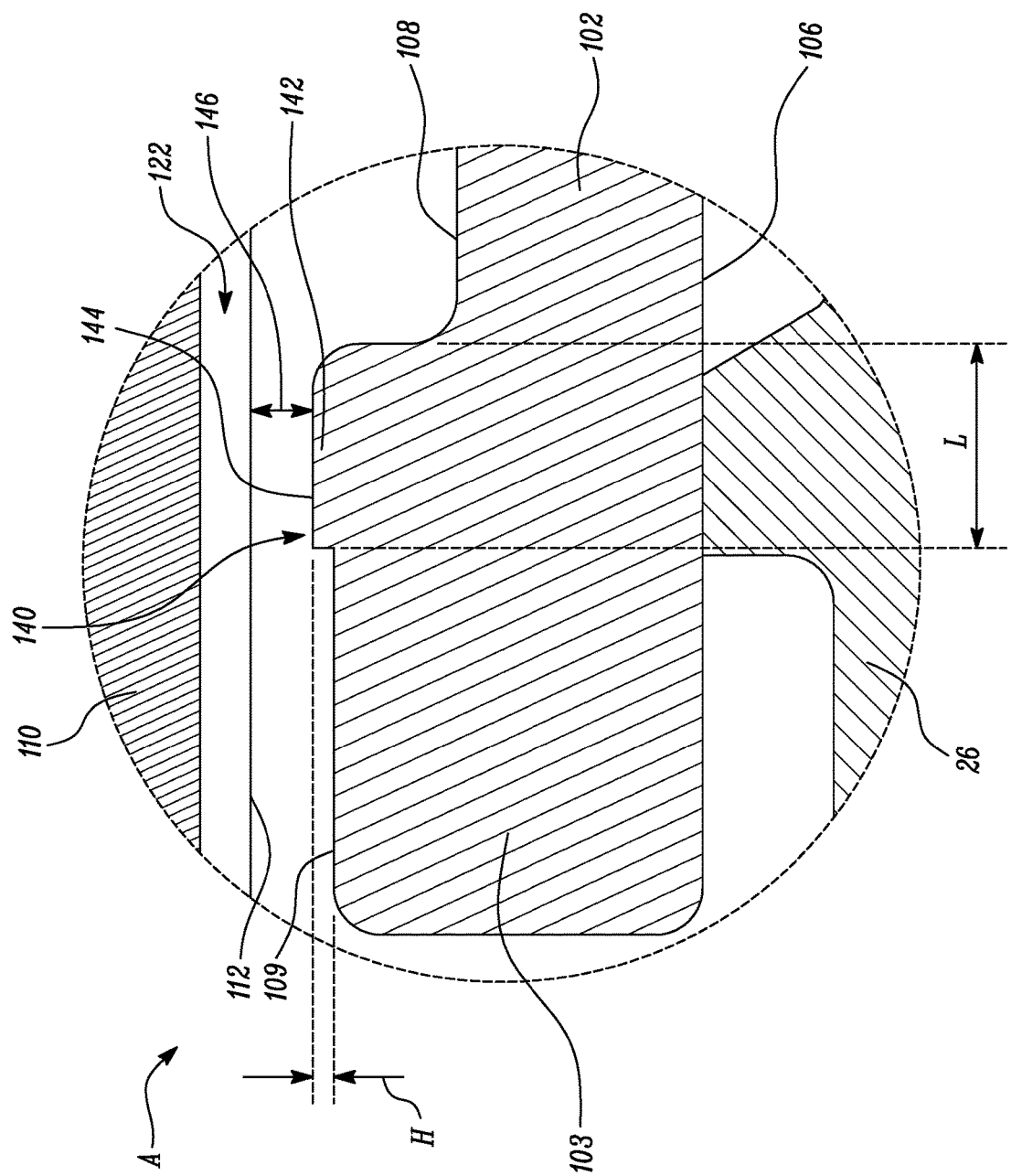
FIG. 4B is a detailed view of a portion A of FIG. 4A according to an embodiment of the present disclosure.

FIG. 4A illustrates a sectional side view of a roller bearing arrangement 100 for a gas turbine engine 10 (shown in FIG. 1). The roller bearing arrangement 100 includes a fan shaft 26. FIG. 4B illustrates a detailed view of a portion A of FIG. 4A.

The fan shaft 26 defines an axis of rotation 29. In some embodiments, the axis of rotation 29 may coincide with the principal rotational axis 9 of the gas turbine engine 10 (shown in FIG. 1). The fan shaft 26 includes a radially outer surface 50. The radially outer surface 50 and the axis of rotation 29 of the fan shaft 26 define a maximum radial distance 55 therebetween.

The roller bearing arrangement 100 further includes a stub shaft 110. The stub shaft 110 includes a radially inner surface 112 and a radially outer surface 114 parallel with and opposite to the radially inner surface 112.

The stub shaft 110 is connected to the fan shaft 26 and extends radially away therefrom so as to create a first axial bearing surface 118 on the radially outer surface 114 of the stub shaft 110. The first axial bearing surface 118 is parallel with the axis of rotation 29. The first axial bearing surface 118 and the axis of rotation 29 define a maximum radial distance 116 therebetween.

The stub shaft 110 may be connected to the fan shaft 26 by any suitable method, such as, bolting, welding, and the like. In the illustrated embodiment of FIG. 4A, the stub shaft 110 is connected to the fan shaft 26 via an interference fit 120. Specifically, in the illustrated embodiment of FIG. 4, the interference fit 120 is provided between a portion of a fan disk 70 and the fan shaft 26.

The first axial bearing surface 118 is axially spaced apart from the interference fit 120. Specifically, in the illustrated embodiment of FIG. 4, the first axial bearing surface 118 is positioned axially downstream from the interference fit 120 relative to the axis of rotation 29. The first axial bearing surface 118 being axially spaced apart from the interference fit 120 may ensure that the first axial bearing surface 118 remains concentric with the axis of rotation 29 of the fan shaft 26, at least during normal operating conditions (e.g., cruise conditions of an aircraft).

The first axial bearing surface 118 is at a greater radial distance from the axis of rotation 29 than the radially outer surface 50 of the fan shaft 26. In other words, the first axial bearing surface 118 is radially spaced apart from the radially outer surface 50 of the fan shaft 26. That is, the maximum radial distance 116 between the first axial bearing surface 118 and the axis of rotation 29 is greater than the maximum radial distance 55 between the radially outer surface 50 of the fan shaft 26 and the axis of rotation 29.

The roller bearing arrangement 100 further includes a static structure 127. The static structure 127 may be designed to be capable of withstanding ultimate loads (e.g., loads during a fan blade-off event) from the fan shaft 26. The static structure 127 has a second axial bearing surface 128 parallel with and opposite to the first axial bearing surface 118.

The roller bearing arrangement 100 further includes a plurality of roller bearing elements 130 positioned between the first axial bearing surface 118 and the second axial bearing surface 128. The plurality of roller bearing elements 130 may be configured to transfer loads from the fan shaft 26 to the static structure 127 of the roller bearing arrangement 100.

In the illustrated embodiment of FIG. 4A, the roller bearing arrangement 100 further includes an inner race 132 at least partially disposed on the first axial bearing surface 118 and an outer race 134 at least partially disposed on the second axial bearing surface 128. Furthermore, in the illustrated embodiment of FIG. 4A, the plurality of roller bearing elements 130 is at least partially received between the inner race 132 and the outer race 134.

The inner race 132 and the outer race 134 may be disposed substantially parallel to each other in order to ensure an even load distribution across the plurality of roller bearing elements 130. However, the inner and outer races 132, 134 may deform if an interference fit, such as the interference fit 120 is within close proximity of the inner and outer races 132, 134. This deformation (also known as "coning") may result in a poor load distribution and a greater peak stress experienced by the plurality of roller bearing elements 130. To reduce or prevent deformation of the inner race 132 and the outer race 134, the first axial bearing surface 118 may be axially spaced apart from the interference fit 120. Therefore, the interference fit 120 being axially spaced apart from the interference fit 120 may minimize coning of the inner race 132 and the outer race 134, and ensure even load distribution across the plurality of roller bearing elements 130.

In the illustrated embodiment of FIG. 4A, the stub shaft 110 further includes a plurality of scallops 122 (best shown in FIGS. 5A and 5B) on the radially inner surface 112 of the stub shaft 110. In the illustrated embodiment of FIG. 4A, the stub shaft 110 further includes a plurality of channels 126 (best shown in FIGS. 5A and 5B) fluidly communicating the plurality of scallops 122 with the first axial bearing surface 118. Furthermore, each scallop 122 is configured receive a lubricant 75 from a lubricant supply 80. In some embodiments, the lubricant supply 80 may be configured to provide the lubricant 75 as an oil jet to each scallop 122. Thus, in some embodiments, each scallop 122 may receive the lubricant 75 as the oil jet from the lubricant supply 80.

The plurality of channels 126 may feed the lubricant 75 to the plurality of roller bearing elements 130, thereby providing lubrication and cooling to the plurality of roller bearing elements 130. In some embodiments, the plurality of channels 126 may be configured to create an annular film of the lubricant 75 on either axial side of the plurality of roller bearing elements 130, such that the annular film lubricates and cools the plurality of roller bearing elements 130. Such lubrication of the plurality of roller bearing elements 130 may be facilitated due to the interference fit 120 being axially spaced apart from the first axial bearing surface 118.

However, the first axial bearing surface 118 being axially spaced apart from the interference fit 120 may create a cantilever effect in the stub shaft 110. The stub shaft 110 may be subjected to the ultimate loads by the fan shaft 26 during a structural failure of the gas turbine engine 10. An example of such structural failure includes a blade-off event, in which at least one blade of the propulsive fan 23 breaks off within the gas turbine engine 10. In some cases, the stub shaft 110 may be deflected radially inwards towards the fan shaft 26 due to the cantilever effect and the ultimate loads. In extreme cases, this could damage the stub shaft 110.

To prevent damage to the stub shaft 110 from ultimate loads, the roller bearing arrangement 100 further includes a first snubber 140 positioned between the radially outer surface 50 of the fan shaft 26 and the radially inner surface 112 of the stub shaft 110. Shape and dimensions of the first snubber 140 may depend upon various factors, such as magnitudes of the ultimate loads, and designs of the stub shaft 110 and the fan shaft 26.

The first snubber 140 is spaced apart from the radially inner surface 112 of the stub shaft 110 or the radially outer surface 50 of the fan shaft 26 so as to limit a radial movement range of the stub shaft 110. In other words, the first snubber 140 is spaced apart from one of the radially inner surface 112 of the stub shaft 110 and the radially outer surface 50 of the fan shaft 26 so as to limit the radial movement range of the stub shaft 110.

During events inducing the ultimate loads, the stub shaft 110 may radially deflect inwards such that the first snubber 140 contacts one of the radially inner surface 112 of the stub shaft 110 or the radially outer surface 50 of the fan shaft 26 so as to limit the radial movement range of the stub shaft 110. Therefore, a secondary load path may be temporarily formed for time periods of the ultimate loads. As a result, the stub shaft 110 may be configured to independently support only normal operating loads and limit loads rather than also having to independently withstand ultimate loads. Thus, the stub shaft 110 may be designed to be compact and lightweight.

Furthermore, in the illustrated embodiment of FIG. 4A, the first snubber 140 is axially aligned with the plurality of roller bearing elements 130. The first snubber 140 being axially aligned with the plurality of roller bearing elements 130 may ensure even load distribution across the plurality of roller bearing elements 130 when the stub shaft 110 contacts the first snubber 140 and may prevent coning of the inner race 132 and the outer race 134.

In the illustrated embodiment of FIG. 4A, the first snubber 140 is an extension 142 of an output shaft 102 from a power gear box 104 extending radially outward towards the radially inner surface 112 of the stub shaft 110. In other words, in the illustrated embodiment of FIG. 4A, the roller bearing arrangement 100 further includes the output shaft 102 of the power gear box 104 including the first snubber 140. In some embodiments, the first snubber 140 may be integrally formed with the output shaft 102.

In the illustrated embodiment of FIG. 4A, the first snubber 140 is spaced apart from the radially inner surface 112 of the stub shaft 110. Further, the first snubber 140 includes a radially outer surface 144. The radially outer surface 144 of the first snubber 140 and the radially inner surface 112 of the stub shaft 110 define a first radial clearance 146 therebetween. The first radial clearance 146 may depend upon design attributes and a material of the stub shaft 110. The first radial clearance 146 may further depend upon loads to be experienced by the stub shaft 110. In some embodiments, the first radial clearance 146 may be less than or equal to about 1 millimetre (mm).

The output shaft 102 includes a radially inner surface 106 and a radially outer surface 108 generally parallel with and opposite to the radially inner surface 106. In the illustrated embodiment of FIG. 4A, the fan shaft 26 further includes an extension 60 extending radially outwards from the radially outer surface 50 of the fan shaft 26 and aligned with the first snubber 140. In some other embodiments, the fan shaft 26 may include more than one extension 60 extending from the radially outer surface 50 of the fan shaft 26 and aligned with the first snubber 140.

In the illustrated embodiment FIG. 4A, the output shaft 102 is in contact with the radially outer surface 50 of the fan shaft 26 opposite to the first snubber 140. Specifically, in the illustrated embodiment FIG. 4A, the radially inner surface 106 of the output shaft 102 is in contact with the radially outer surface 50 of the fan shaft 26 at the extension 60, opposite to the first snubber 140. However, this is not essential, with a gap between the radially inner surface 106 of the output shaft 102 and the radially outer surface 50 of the fan shaft 26 being possible whilst maintain the functionality of the roller bearing arrangement 100.

In some embodiments, the extension 60 may be integrally formed with the fan shaft 26. However, in some other embodiments, the extension 60 may be separately formed from the fan shaft 26 and coupled to the fan shaft 26. The extension 60 of the fan shaft 26 may be configured to radially locate the output shaft 102. Furthermore, the extension 60 may support the output shaft 102, while allowing reduction of a diameter of a major portion of the fan shaft 26, thereby decreasing a weight of the fan shaft 26.

While the first snubber 140 is the extension 142 of the output shaft 102 in the illustrated embodiment of FIG. 4A, in some embodiments, the first snubber 140 may be an extension of the fan shaft 26 extending radially outward towards the radially inner surface 112 of the stub shaft 110. In some other embodiments, the first snubber 140 may be an extension of the stub shaft 110 extending radially inward towards the radially outer surface 50 of the fan shaft 26. In some embodiments, the first snubber 140 may include two snubber portions. In such embodiments, one snubber portion of the two snubber portions may be an extension of the fan shaft 26 extending radially outward towards the radially inner surface 112 of the stub shaft 110, and another snubber portion of the two snubber portions may be an extension of the stub shaft 110 extending radially inward towards the radially outer surface 50 of the fan shaft 26. It may be noted that various configurations of the first snubber 140 may be contemplated and are intended to be within the scope of the present disclosure.

Referring to FIGS. 4A and 4B, the output shaft 102 includes an end portion 103 having a radial thickness greater than a radial thickness of a rest of the output shaft 102. A surface portion 109 of the radially outer surface 108 of the output shaft 102 corresponding to the end portion 103 is located at a radially outward position relative to the radially outer surface 108 of the rest of the output shaft 102. The first snubber 140 is disposed on the end portion 103. Further, the first snubber 140 defines a radial height H relative to the surface portion 109 of the radially outer surface 108 of the end portion 103 of the output shaft 102. The first snubber 140 further defines an axial length L along the axis of rotation 29. The radial height H and the axial length L of the first snubber 140 may depend on various parameters, such as expected loads on the first snubber 140, the first radial clearance 146, a material of the output shaft 102, and so forth. The radial height H may be equal to zero, such that the first snubber 140 effectively extends along the entire length of the end portion 103.

FIG. 5A illustrates a portion of the stub shaft 110 including the plurality of scallops 122, and FIG. 5B illustrates a schematic side view of a portion of the radially inner surface 112 of the stub shaft 110.

Referring to FIGS. 4A, 5A, and 5B, the scallops 122 are circumferentially spaced apart from each other. In some embodiments, the plurality of scallops 122 may include about 20 scallops on the radially inner surface 112 of the stub shaft 110. Further, the scallops 122 include corresponding channels 126. As discussed above, each scallop 122 is configured to receive the lubricant 75 from the lubricant supply 80. Further, each channel 126 is configured to supply the lubricant 75 to the first axial bearing surface 118. In some embodiments, the lubricant 75 from the lubricant supply 80 may be used as a lubricating agent and/or a cooling agent for the plurality of roller bearing elements 130.

Figure 6B:
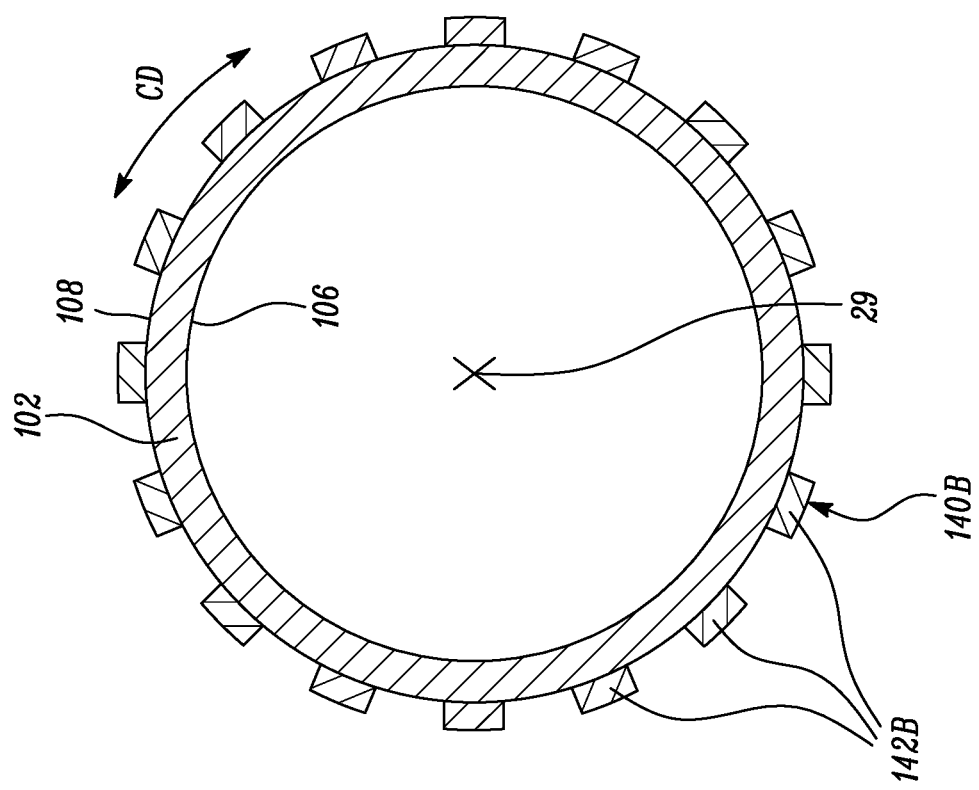
FIG. 6B is a sectional front view of the output shaft of FIG. 4A including a first snubber according to another embodiment of the present disclosure.
Figure 6A:
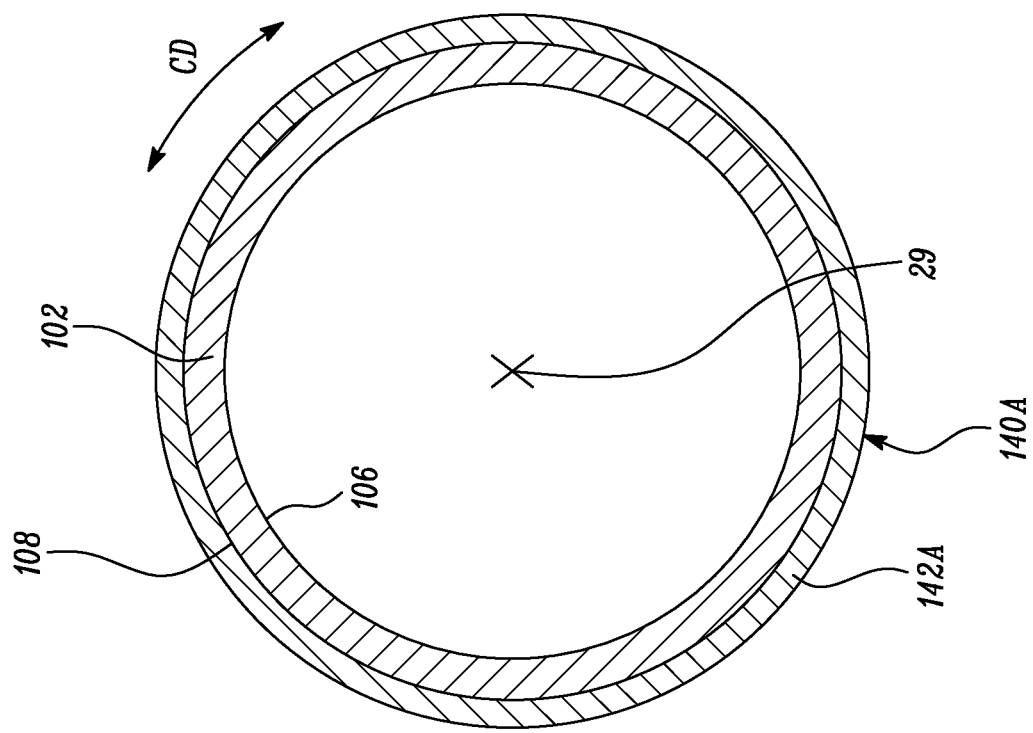
FIG. 6A is a sectional front view of an output shaft of FIG. 4A including a first snubber according to an embodiment of the present disclosure.

FIG. 6A illustrates a schematic sectional front view of the output shaft 102 of FIG. 4A according to an embodiment of the present disclosure. In the illustrated embodiment of FIG. 6A, the output shaft 102 includes a first snubber 140A similar to the first snubber 140 of FIG. 4A. Specifically, the first snubber 140A extends radially outward from the outer surface 108 of the output shaft 102. However, the first snubber 140A is a continuous extension 142A having a circumferential extent of 360 degrees. In other words, the first snubber 140A continuously extends in the circumferential direction. The circumferential direction relative to the axis of rotation 29 is indicated by an arrow CD in FIG. 6A.

FIG. 6B illustrates a sectional front view of the output shaft 102 of FIG. 4A according to another embodiment of the present disclosure. In the illustrated embodiment of FIG. 6B, the output shaft 102 includes a first snubber 140B similar to the first snubber 140 of FIG. 4A. Specifically, the first snubber 140B extends radially outward from the outer surface 108 of the output shaft 102. However, the first snubber 140B includes a plurality of first snubber segments 142B circumferentially spaced apart from each other. In other words, the first snubber 140B discontinuously extends in the circumferential direction indicated by the arrow CD.

Figure 7:
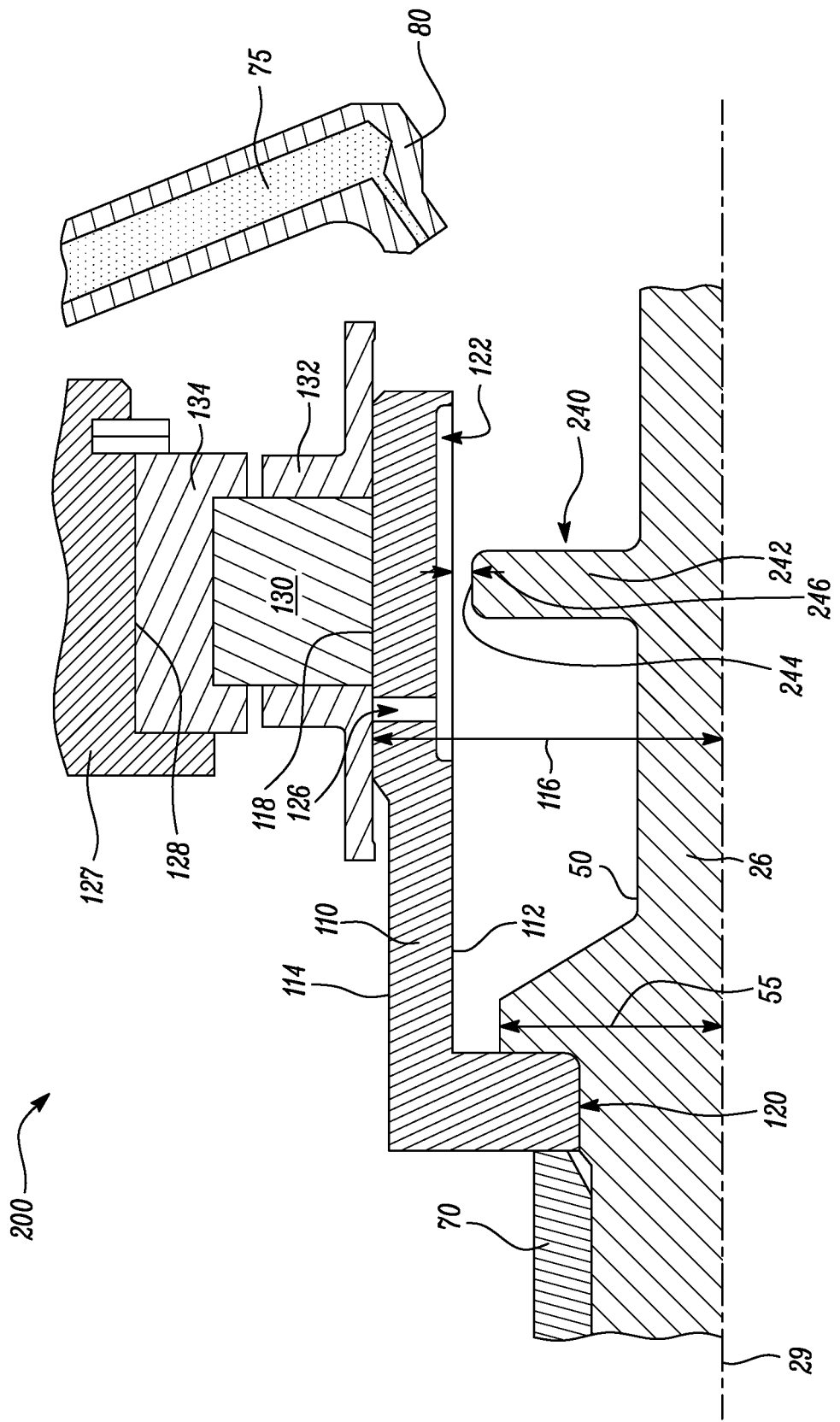
FIG. 7 is a sectional side view of a roller bearing arrangement according to an embodiment of the present disclosure.

FIG. 7 illustrates a sectional side view of a roller bearing arrangement 200 according to another embodiment of the present disclosure. The roller bearing arrangement 200 is similar to the roller bearing arrangement 100 of FIG. 4A. Accordingly, similar features between the roller bearing arrangement 100 and the roller bearing arrangement 200 are designated by the same reference numbers. However, the roller bearing arrangement 200 includes a first snubber 240 having a different configuration from the first snubber 140 of FIG. 4A.

Specifically, in the illustrated embodiment of FIG. 7, the first snubber 240 is an extension 242 of the fan shaft 26 extending radially outward towards the radially inner surface 112 of the stub shaft 110. The first snubber 240 is positioned between the radially outer surface 50 of the fan shaft 26 and the radially inner surface 112 of the stub shaft 110. The first axial bearing surface 118 is axially spaced apart from the interference fit 120.

Further, the first snubber 240 includes a radially outer surface 244. The first snubber 240 is spaced apart from the radially inner surface 112 of the stub shaft 110 so as to limit the radial movement range of the stub shaft 110. Therefore, the radially outer surface 244 of the first snubber 240 and the radially inner surface 112 of the stub shaft 110 define a first radial clearance 246 therebetween. In some embodiments, the first radial clearance 246 may be less than or equal to about 1 mm.

Figure 8B:
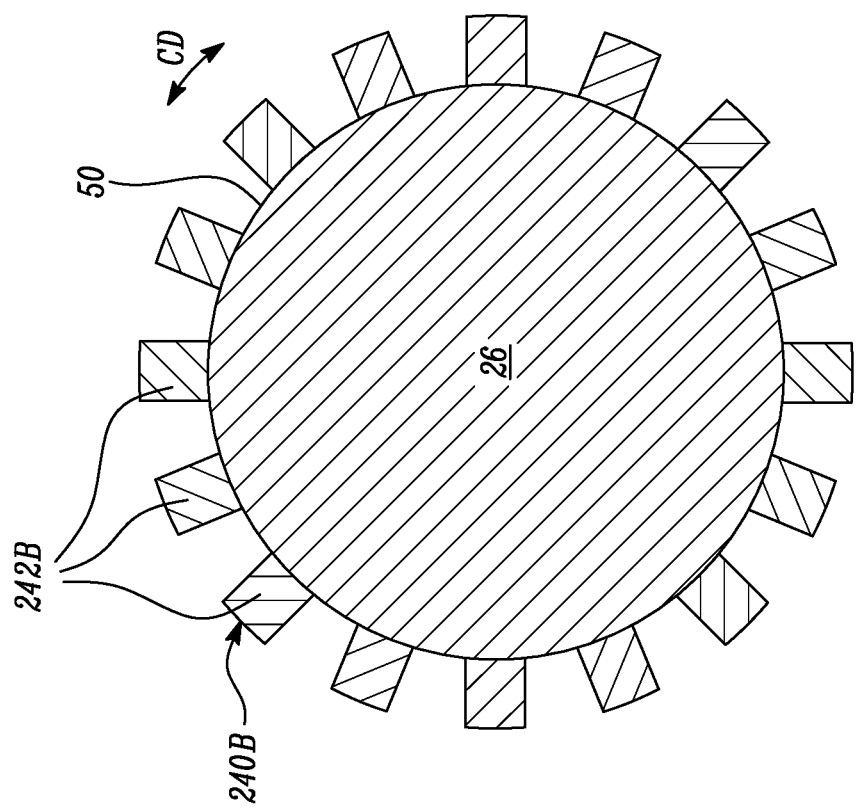
FIG. 8B is a sectional front view of the fan shaft of FIG. 7 including a first snubber according to another embodiment of the present disclosure.
Figure 8A:
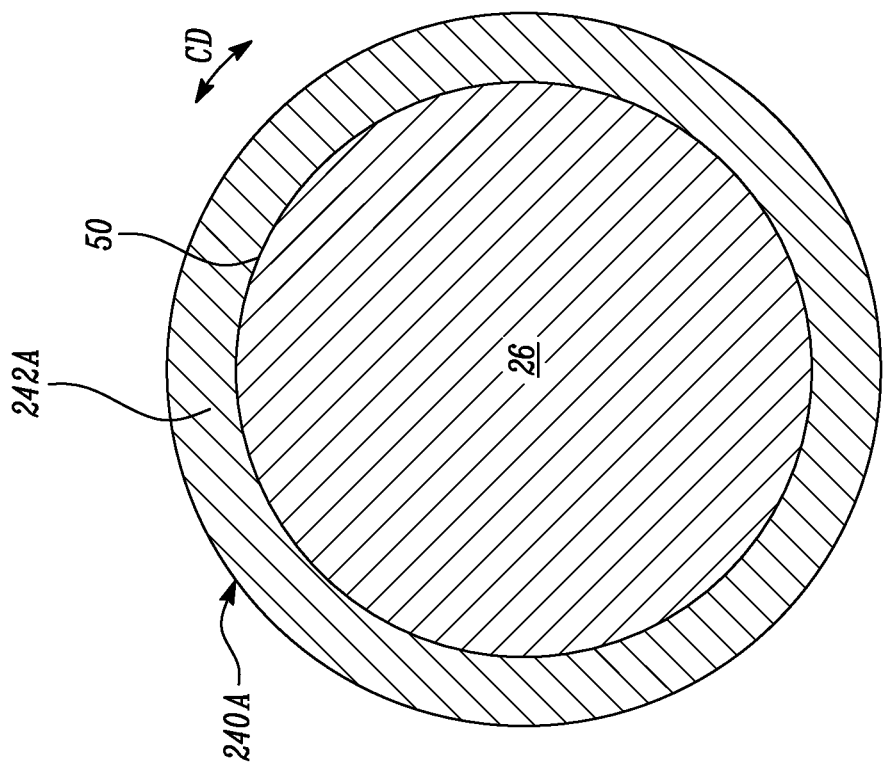
FIG. 8A is a sectional front view of a fan shaft of FIG. 7 including a first snubber according to an embodiment of the present disclosure.

FIG. 8A illustrates a sectional front view of the fan shaft 26 of FIG. 7 according to an embodiment of the present disclosure. In the illustrated embodiment of FIG. 8A, the fan shaft 26 includes a first snubber 240A similar to the first snubber 240 of FIG. 7. Specifically, the first snubber 240A extends radially outward from the radially outer surface 50 of the fan shaft 26. However, the first snubber 240A is a continuous extension 242A having a circumferential extent of 360 degrees. In other words, the first snubber 240A continuously extends in the circumferential direction (indicated by the arrow CD).

FIG. 8B illustrates a sectional front view of the fan shaft 26 of FIG. 7 according to another embodiment of the present disclosure. In the illustrated embodiment of FIG. 8B, the fan shaft 26 includes a first snubber 240B similar to the first snubber 240 of FIG. 7. Specifically, the first snubber 240B extends radially outward from the radially outer surface 50 of the fan shaft 26. However, the first snubber 240B includes a plurality of first snubber segments 242B circumferentially spaced apart from each other. In other words, the first snubber 240B discontinuously extends in the circumferential direction (indicated by the arrow CD).

Figure 9:
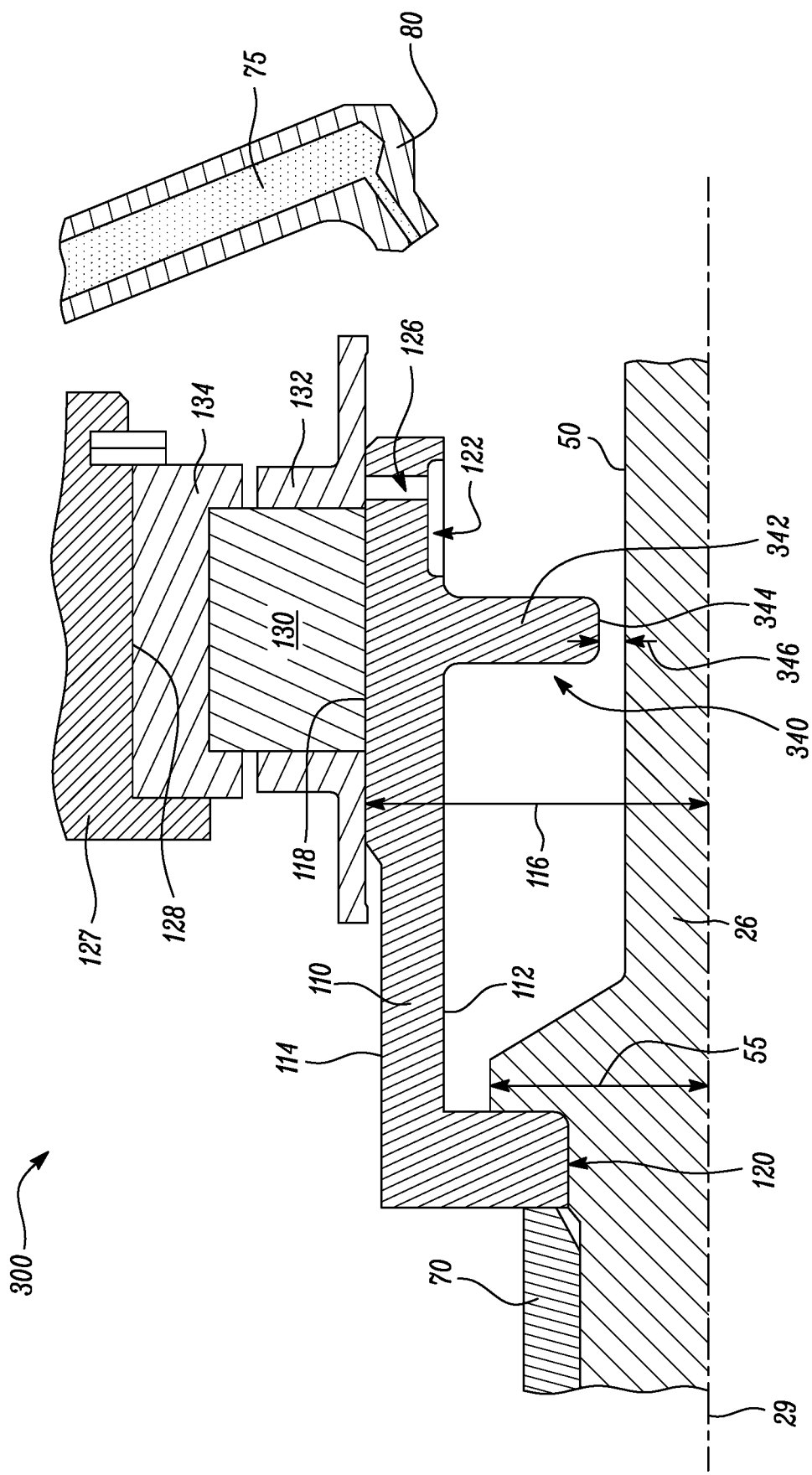
FIG. 9 is a sectional side view of a roller bearing arrangement according to an embodiment of the present disclosure.

FIG. 9 illustrates a sectional side view of a roller bearing arrangement 300 according to another embodiment of the present disclosure. The roller bearing arrangement 300 is similar to the roller bearing arrangement 100 of FIG. 4A. Accordingly, similar features between the roller bearing arrangement 100 and the roller bearing arrangement 300 are designated by the same reference numbers. However, the roller bearing arrangement 300 includes a first snubber 340 having a different configuration from the first snubber 140 of FIG. 4A.

Specifically, in the illustrated embodiment of FIG. 9, the first snubber 340 is an extension 342 of the stub shaft 110 extending radially inward towards the radially outer surface 50 of the fan shaft 26. The first snubber 340 is positioned between the radially outer surface 50 of the fan shaft 26 and the radially inner surface 112 of the stub shaft 110.

Further, the first snubber 340 includes a radially inner surface 344. The first snubber 340 is spaced apart from the radially outer surface 50 of the fan shaft 26 so as to limit the radial movement range of the stub shaft 110. Therefore, the radially inner surface 344 of the first snubber 340 and the radially outer surface 50 of the fan shaft 26 define a first radial clearance 346 therebetween. In some embodiments, the first radial clearance 346 may be less than or equal to about 1 mm.

Figure 10B:
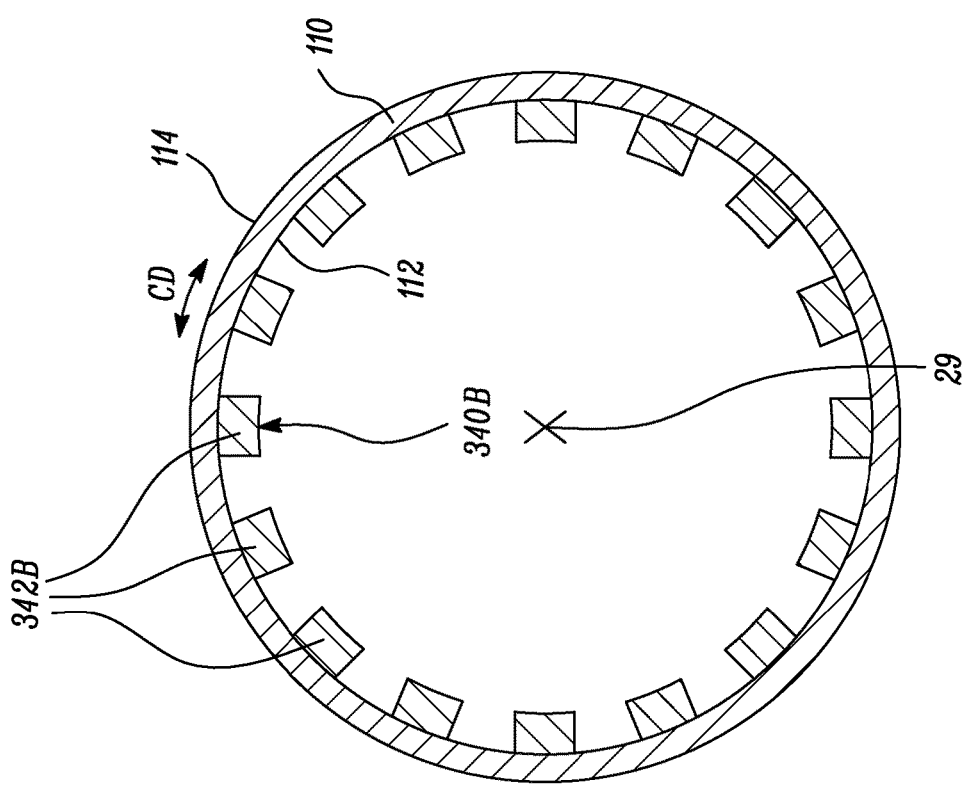
FIG. 10B is a sectional front view of the stub shaft of FIG. 9 including a first snubber according to another embodiment of the present disclosure.
Figure 10A:
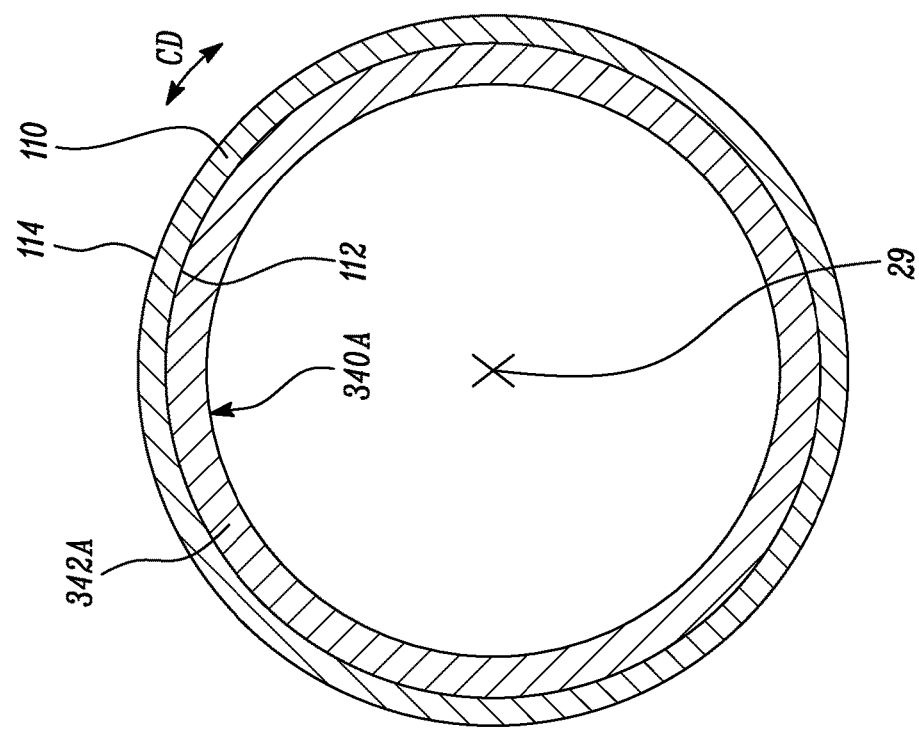
FIG. 10A is a sectional front view of a stub shaft of FIG. 9 including a first snubber according to an embodiment of the present disclosure.

FIG. 10A illustrates a sectional front view of the stub shaft 110 of FIG. 9 according to an embodiment of the present disclosure. In the illustrated embodiment of FIG. 10A, the stub shaft 110 includes a first snubber 340A similar to the first snubber 340 of FIG. 9. Specifically, the first snubber 340A extends radially inward from the radially inner surface 112 of the stub shaft 110. However, the first snubber 340A is a continuous extension 342A having a circumferential extent of 360 degrees. In other words, the first snubber 340A continuously extends in the circumferential direction (indicated by the arrow CD).

FIG. 10B illustrates a sectional front view of the stub shaft 110 of FIG. 9 according to another embodiment of the present disclosure. In the illustrated embodiment of FIG. 10B, the stub shaft 110 includes a first snubber 340B similar to the first snubber 340 of FIG. 9. Specifically, the first snubber 340B extends radially inward from the radially inner surface 112 of the stub shaft 110. However, the first snubber 340B includes a plurality of first snubber segments 342B circumferentially spaced apart from each other. In other words, the first snubber 340B discontinuously extends in the circumferential direction (indicated by the arrow CD).

Figure 11:
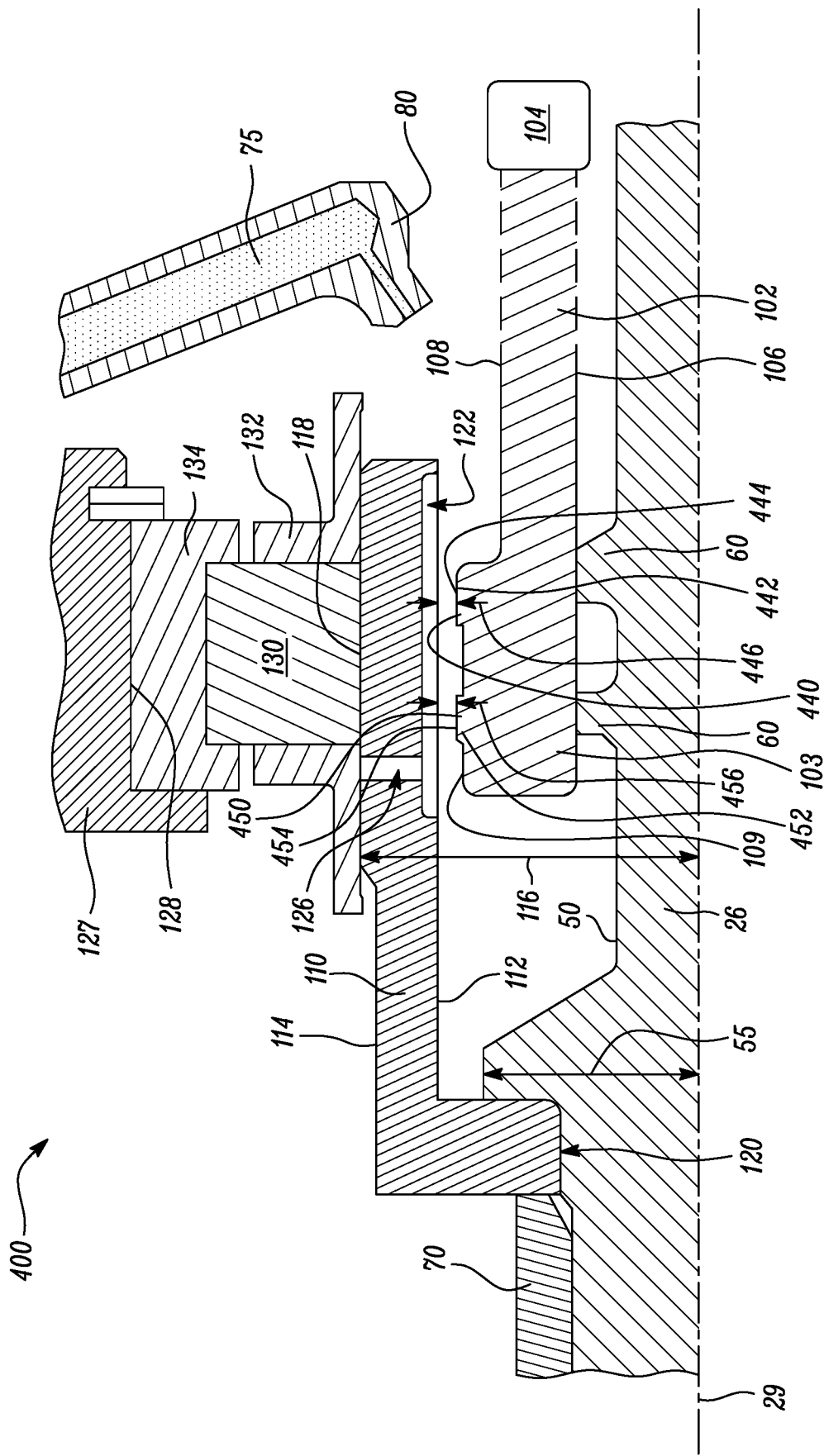
FIG. 11 is a sectional side view of a roller bearing arrangement according to an embodiment of the present disclosure.

FIG. 11 illustrates a sectional side view of a roller bearing arrangement 400 according to another embodiment of the present disclosure. The roller bearing arrangement 400 is similar to the roller bearing arrangement 100 of FIG. 4A. Accordingly, similar features between the roller bearing arrangement 100 and the roller bearing arrangement 400 are designated by the same reference numbers. The roller bearing arrangement 400 includes a first snubber 440 similar to the first snubber 140 of FIG. 4A. Specifically, the first snubber 440 is positioned between the radially outer surface 50 of the fan shaft 26 and the radially inner surface 112 of the stub shaft 110. Furthermore, the first snubber 440 is an extension 442 of the output shaft 102 from the power gear box 104 extending radially outward towards the radially inner surface 112 of the stub shaft 110. The first snubber 440 is spaced apart from the radially inner surface 112 of the stub shaft 110 so as to limit the radial movement range of the stub shaft 110. However, the roller bearing arrangement 400 further includes a second snubber 450. The second snubber 450 is at an axially distinct position from the first snubber 440.

Specifically, in the illustrated embodiment of FIG. 11, the second snubber 450 is an extension 452 of the output shaft 102 from the power gear box 104 extending radially outward towards a radially inner surface 112 of the stub shaft 110. In the illustrated embodiment of FIG. 11, the first and second snubbers 440, 450 are axially aligned with the plurality of roller bearing elements 130. Further, the first and second snubbers 440, 450 are disposed on the end portion 103 of the output shaft 102. However, in some other embodiments, the first and second snubbers 440, 450 may not be axially aligned with the plurality of roller bearing elements 130, and may be spaced further axially apart from each other. In some embodiments, either or both of the first and second snubbers 440, 450 may be axially spaced apart from the plurality of roller bearing elements 130. For example, the first snubber 440 may be spaced to one side of the axial location of the roller bearing elements 130, and the second snubber 450 may be spaced to the other side of the axial location of the roller bearing elements 130, such that the roller bearing elements 130 are positioned axially between the first 440 and second 450 snubbers. In some embodiments, shape and dimensions of the first and second snubbers 440, 450 may be substantially similar.

Furthermore, the second snubber 450 includes a radially outer surface 454. In the illustrated embodiment of FIG. 11, the second snubber 450 is spaced apart from the radially inner surface 112 of the stub shaft 110 so as to limit the radial movement range of the stub shaft 110. Therefore, the radially outer surface 454 of the second snubber 450 and the radially inner surface 112 of the stub shaft 110 define a second radial clearance 456 therebetween. In some embodiments, the second radial clearance 456 is substantially equal to a first radial clearance 446 defined between a radially outer surface 444 of the first snubber 440 and the radially inner surface 112 of the stub shaft 110. In some embodiments, the second radial clearance 456 is less than or equal to about 1 mm.

Figure 12B:
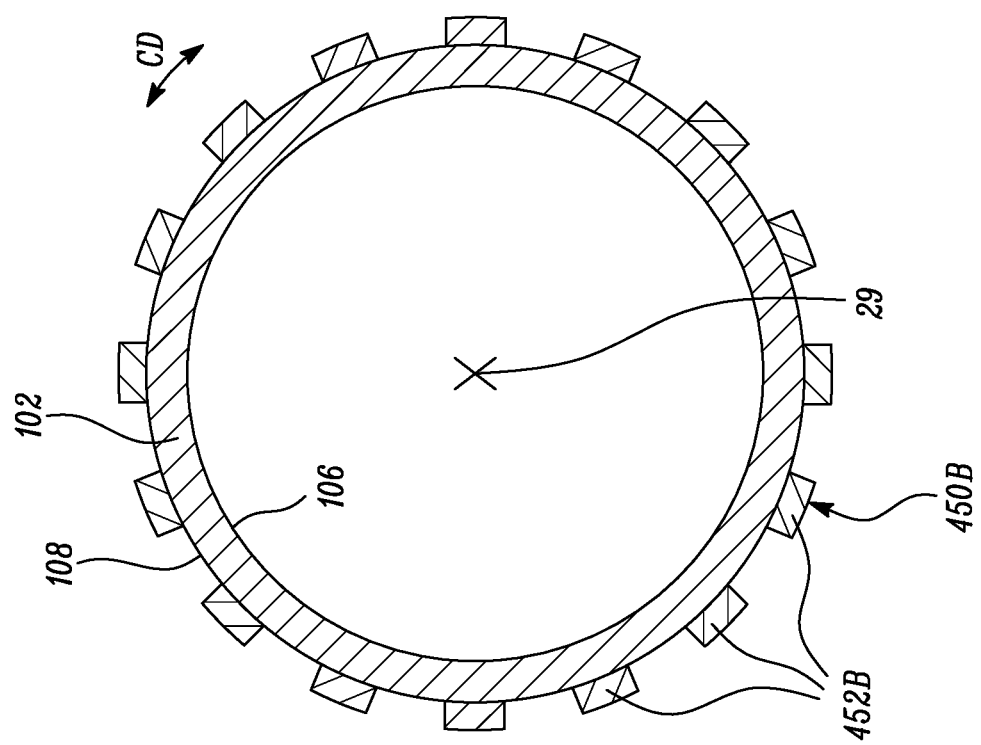
FIG. 12B is a sectional front view of the output shaft of FIG. 11 including a second snubber according to another embodiment of the present disclosure.
Figure 12A:
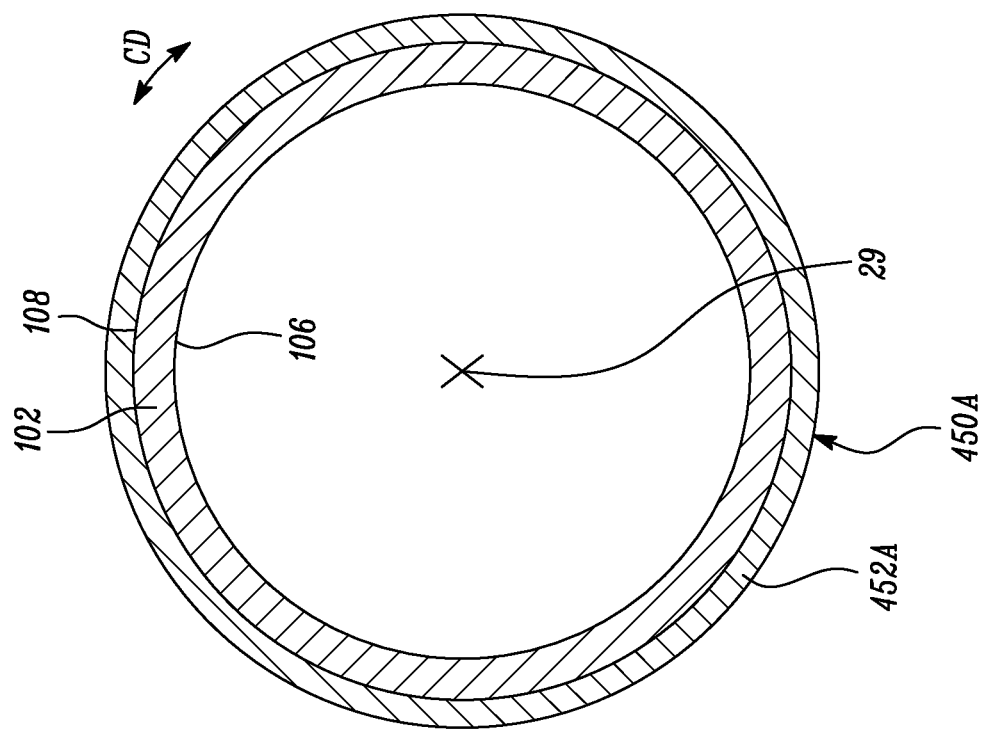
FIG. 12A is a sectional front view of an output shaft of FIG. 11 including a second snubber according to another embodiment of the present disclosure.

FIG. 12A illustrates a sectional front view of the output shaft 102 of FIG. 11 according to an embodiment of the present disclosure. In the illustrated embodiment of FIG. 12A, the output shaft 102 includes a second snubber 450A similar to the second snubber 450 of FIG. 11. Specifically, the second snubber 450A extends radially outward from the radially outer surface 108 of the output shaft 102. However, the second snubber 450A is a continuous extension 452A having a circumferential extent of 360 degrees. In other words, the second snubber 450A continuously extends in the circumferential direction (indicated by the arrow CD).

It will be understood that the first snubber 440 and second snubber 450 can have different configurations. For example, one of the first 440 or second 450 snubber may be a continuous extension having a circumferential extent of 360 degrees, whilst the other of the first 440 or second 450 snubber may comprise a plurality of snubber segments circumferentially spaced apart from each other.

FIG. 12B illustrates a sectional front view of the output shaft 102 of FIG. 11 according to another embodiment of the present disclosure. In the illustrated embodiment of FIG. 12B, the output shaft 102 includes a second snubber 450B similar to the second snubber 450 of FIG. 11. Specifically, the second snubber 450B extends radially outward from the radially outer surface 108 of the output shaft 102. However, the second snubber 450B includes a plurality of second snubber segments 452B circumferentially spaced apart from each other. In other words, the second snubber 450B discontinuously extends in the circumferential direction (indicated by the arrow CD).

Figure 13:
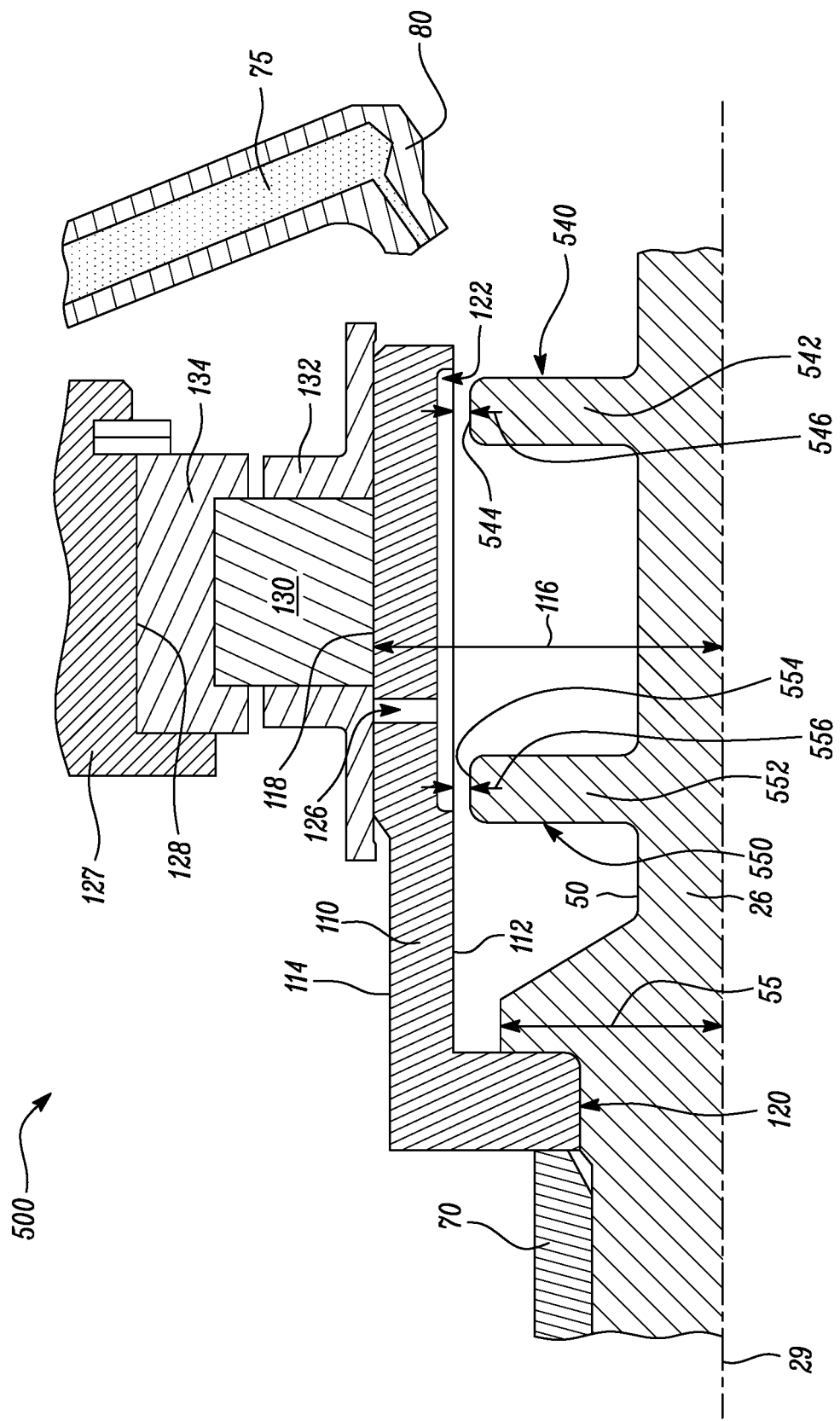
FIG. 13 is a sectional side view of a roller bearing arrangement according to an embodiment of the present disclosure.

FIG. 13 illustrates a sectional side view of a roller bearing arrangement 500 according to another embodiment of the present disclosure. The roller bearing arrangement 500 is similar to the roller bearing arrangement 200 of FIG. 7. Accordingly, similar features between the roller bearing arrangement 200 and the roller bearing arrangement 500 are designated by the same reference numbers. The roller bearing arrangement 500 includes a first snubber 540 similar to the first snubber 240 of FIG. 7. Specifically, the first snubber 540 is an extension 542 of the fan shaft 26 extending radially outward towards the radially inner surface 112 of the stub shaft 110. Furthermore, the first snubber 540 is positioned between the radially outer surface 50 of the fan shaft 26 and the radially inner surface 112 of the stub shaft 110. The first snubber 540 is spaced apart from the radially inner surface 112 of the stub shaft 110 so as to limit the radial movement range of the stub shaft 110. However, the first snubber 540 is not axially aligned with the plurality of roller bearing elements 130. Moreover, the roller bearing arrangement 500 further includes a second snubber 550. The second snubber 550 is at an axially distinct position from the first snubber 540.

Specifically, in the illustrated embodiment of FIG. 13, the second snubber 550 is an extension 552 of the fan shaft 26 extending radially outward towards the radially inner surface 112 of the stub shaft 110. Further, the second snubber 550 is not axially aligned with the plurality of roller bearing elements 130. In other words, in the illustrated embodiment of FIG. 13, each of the first and second snubbers 540, 550 are not axially aligned with the plurality of roller bearing elements 130. In some embodiments, shape and dimensions of the first and second snubbers 540, 550 may be substantially similar.

The second snubber 550 includes a radially outer surface 554. The second snubber 550 is spaced apart from the radially inner surface 112 of the stub shaft 110 so as to limit the radial movement range of the stub shaft 110. Therefore, the radially outer surface 554 of the second snubber 550 and the radially inner surface 112 of the stub shaft 110 define a second radial clearance 556 therebetween. In some embodiments, the second radial clearance 556 is substantially equal to a first radial clearance 546 defined between a radially outer surface 544 of the first snubber 540 and the radially inner surface 112 of the stub shaft 110. In some embodiments, the second radial clearance 556 is less than or equal to about 1 mm.

Figure 14B:
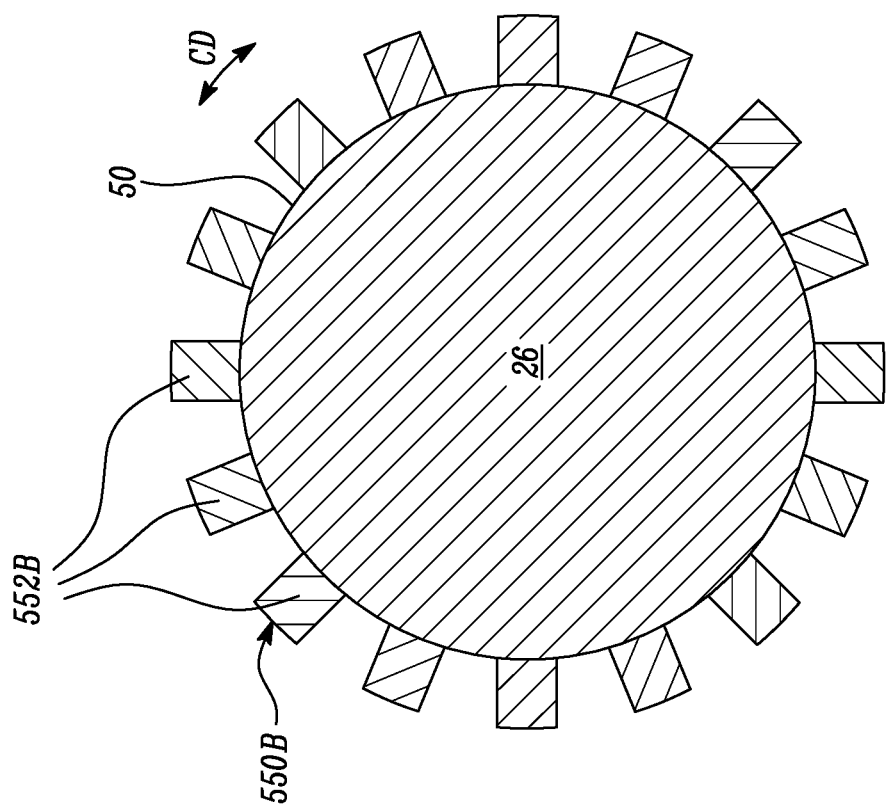
FIG. 14B is a sectional front view of the fan shaft of FIG. 13 including a second snubber according to another embodiment of the present disclosure.
Figure 14A:
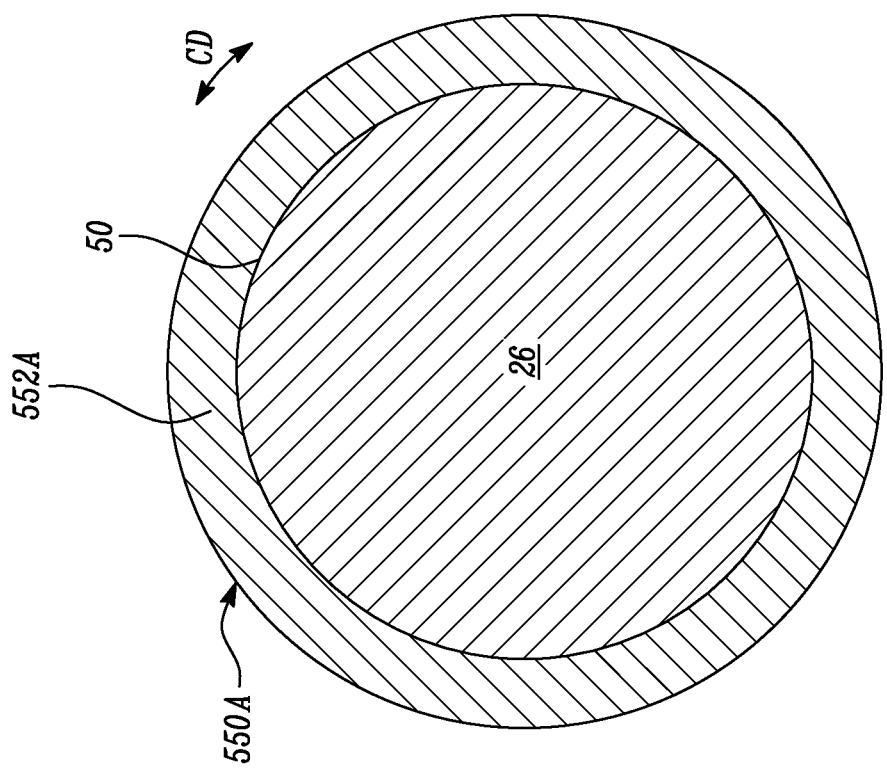
FIG. 14A is a sectional front view of a fan shaft of FIG. 13 including a second snubber according to another embodiment of the present disclosure.

FIG. 14A illustrates a sectional front view of the fan shaft 26 of FIG. 13 according to an embodiment of the present disclosure. In the illustrated embodiment of FIG. 14A, the fan shaft 26 includes a second snubber 550A similar to the second snubber 550 of FIG. 13. Specifically, the second snubber 550A extends radially outward from the radially outer surface 50 of the fan shaft 26. However, the second snubber 550A is a continuous extension 552A having a circumferential extent of 360 degrees. In other words, the second snubber 550A continuously extends in the circumferential direction (indicated by the arrow CD).

FIG. 14B illustrates a sectional front view of the fan shaft 26 of FIG. 13 according to another embodiment of the present disclosure. In the illustrated embodiment of FIG. 14B, the fan shaft 26 includes a second snubber 550B similar to the second snubber 550 of FIG. 13. Specifically, the second snubber 550B extends radially outward from the radially outer surface 50 of the fan shaft 26. However, the second snubber 550B includes a plurality of second snubber segments 552B circumferentially spaced apart from each other. In other words, the second snubber 550B discontinuously extends in the circumferential direction (indicated by the arrow CD).

It will be understood that the first snubber 540 and second snubber 550 can have different configurations. For example, one of the first 540 or second 550 snubber may be a continuous extension having a circumferential extent of 360 degrees, whilst the other of the first 540 or second 550 snubber may comprise a plurality of snubber segments circumferentially spaced apart from each other.

Figure 15:
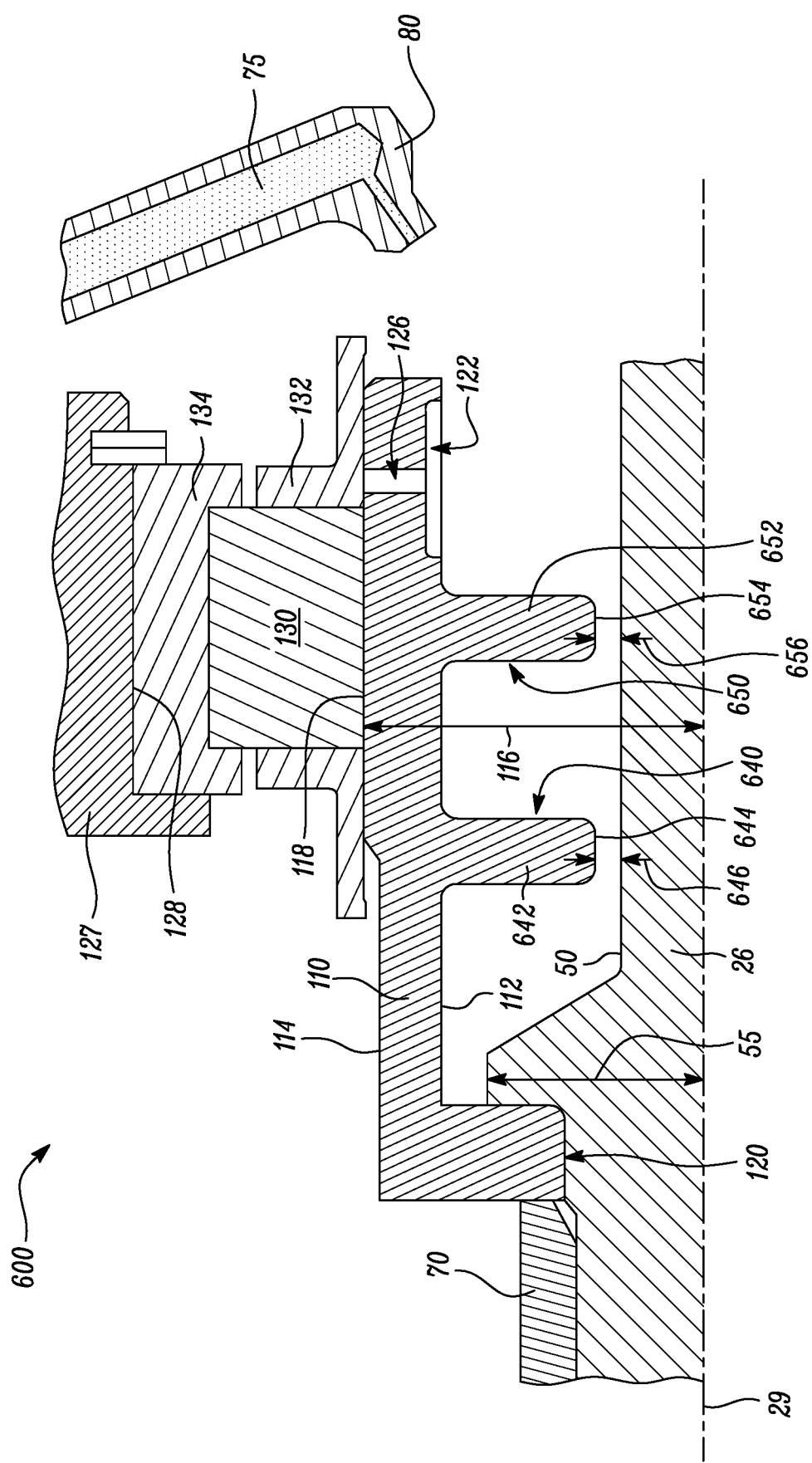
FIG. 15 is a sectional side view of a roller bearing arrangement according to an embodiment of the present disclosure.

FIG. 15 illustrates a sectional side view of a roller bearing arrangement 600 according to another embodiment of the present disclosure. The roller bearing arrangement 600 is similar to the roller bearing arrangement 300 of FIG. 9. Accordingly, similar features between the roller bearing arrangement 300 and the roller bearing arrangement 600 are designated by the same reference numbers. Specifically, the first snubber 640 is an extension 642 of the stub shaft 110 extending radially inward towards the radially outer surface 50 of the fan shaft 26. Furthermore, the first snubber 640 is positioned between the radially outer surface 50 of the fan shaft 26 and the radially inner surface 112 of the stub shaft 110. The first snubber 640 is spaced apart from the radially outer surface 50 of the fan shaft 26 so as to limit the radial movement range of the stub shaft 110. However, the first snubber 640 is not axially aligned with the plurality of roller bearing elements 130. Moreover, the roller bearing arrangement 600 further includes a second snubber 650. The second snubber 650 is at an axially distinct position from the first snubber 640.

In the illustrated embodiment of FIG. 15, the second snubber 650 is an extension 652 of the stub shaft 110 extending radially inward towards the radially outer surface 50 of the fan shaft 26. Further, the second snubber 650 is axially aligned with the plurality of roller bearing elements 130. In some embodiments, shape and dimensions of the first and second snubbers 640, 650 may be substantially similar.

Further, in the illustrated embodiment of FIG. 15, the second snubber 650 includes a radially inner surface 654. In the illustrated embodiment of FIG. 15, the second snubber 650 is spaced apart from the radially outer surface 50 of the fan shaft 26 so as to limit the radial movement range of the stub shaft 110. Therefore, the radially inner surface 654 of the second snubber 650 and the radially outer surface 50 of the fan shaft 26 define a second radial clearance 656 therebetween. In some embodiments, the second radial clearance 656 is substantially equal to a first radial clearance 646 defined between a radially inner surface 644 of the first snubber 640 and the radially outer surface 50 of the fan shaft 26. In some embodiments, the second radial clearance 656 is less than or equal to about 1 mm.

Figure 16B:
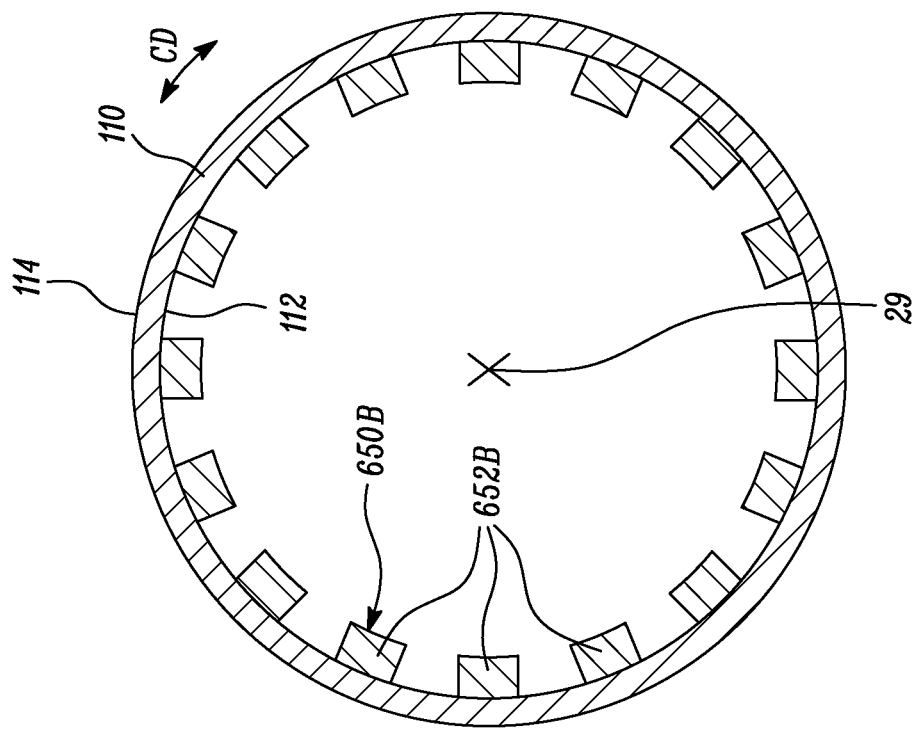
FIG. 16B is a sectional front view of the stub shaft of FIG. 15 including a second snubber according to another embodiment of the present disclosure.
Figure 16A:
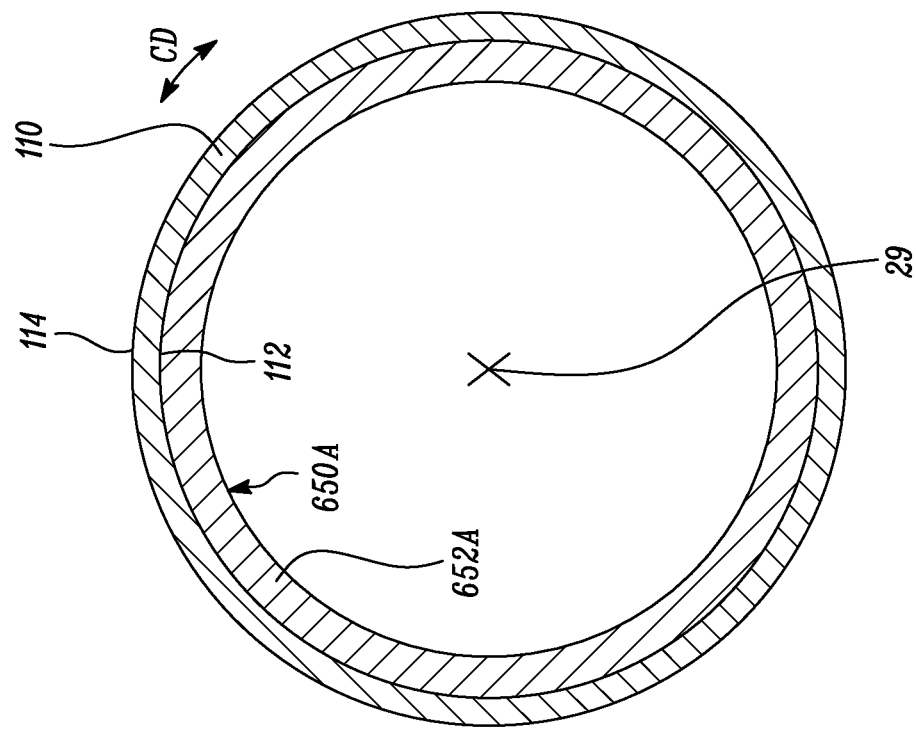
FIG. 16A is a sectional front view of a stub shaft of FIG. 15 including a second snubber according to an embodiment of the present disclosure.

FIG. 16A illustrates a sectional front view of the stub shaft 110 of FIG. 15 according to an embodiment of the present disclosure. In the illustrated embodiment of FIG. 16A, the stub shaft 110 includes a second snubber 650A similar to the second snubber 650 of FIG. 15. Specifically, the second snubber 650 extends radially inward from the radially inner surface 112 of the stub shaft 110. However, the second snubber 650A is a continuous extension 652A having a circumferential extent of 360 degrees. In other words, the second snubber 650A continuously extends radially in the circumferential direction (indicated by the arrow CD).

FIG. 16B illustrates a sectional front view of the stub shaft 110 of FIG. 15 according to an embodiment of the present disclosure. In the illustrated embodiment of FIG. 16B, the stub shaft 110 includes a second snubber 650B similar to the second snubber 650 of FIG. 15. Specifically, the second snubber 650B extends radially inward from the radially inner surface 112 of the stub shaft 110. However, the second snubber 650B includes a plurality of first snubber segments 652B circumferentially spaced apart from each other. In other words, the second snubber 650B discontinuously extends radially inward from the radially inner surface 112 of the stub shaft 110 in the circumferential direction (indicated by the arrow CD).

It will be understood that the first snubber 640 and second snubber 650 can have different configurations. For example, one of the first 640 or second 650 snubber may be a continuous extension having a circumferential extent of 360 degrees, whilst the other of the first 640 or second 650 snubber may comprise a plurality of snubber segments circumferentially spaced apart from each other.

In one aspect, the gas turbine engine 10 is for an aircraft (not shown) and includes any one of the roller bearing arrangements 100, 200, 300, 400, 500, 600 of FIGS. 4A, 7, 9, 11, 13, 15, respectively.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A roller bearing arrangement for a gas turbine engine, the roller bearing arrangement comprising:
a fan shaft, the fan shaft defining an axis of rotation;
a stub shaft, the stub shaft being connected to the fan shaft and extending radially away therefrom so as to create a first axial bearing surface on a radially outer surface of the stub shaft, the first axial bearing surface being parallel with the axis of rotation and at a greater radial distance from the axis of rotation than a radially outer surface of the fan shaft;
a static structure, the static structure having a second axial bearing surface parallel with and opposite to the first axial bearing surface;
a plurality of roller bearing elements positioned between the first axial bearing surface and the second axial bearing surface; and
a first snubber positioned between the radially outer surface of the fan shaft and a radially inner surface of the stub shaft, the first snubber being spaced apart from the radially inner surface of the stub shaft or the radially outer surface of the fan shaft so as to limit a radial movement range of the stub shaft,
wherein the first snubber is an extension of an output shaft from a power gear box extending radially outward towards the radially inner surface of the stub shaft.

2. The roller bearing arrangement of claim 1, wherein the stub shaft is connected to the fan shaft via an interference fit.

3. The roller bearing arrangement of claim 1, wherein the output shaft is in contact with the radially outer surface of the fan shaft opposite to the first snubber.

4. The roller bearing arrangement of claim 1, wherein the first snubber is axially aligned with the plurality of roller bearing elements.

5. The roller bearing arrangement of claim 1, further comprising a second snubber, the second snubber being at an axially distinct position from the first snubber.

6. The roller bearing arrangement of claim 5, wherein the second snubber is an extension of an output shaft from a power gear box extending radially outward towards the radially inner surface of the stub shaft.

7. The roller bearing arrangement of claim 6, wherein the second snubber is a continuous extension having a circumferential extent of 360 degrees.

8. The roller bearing arrangement of claim 6, wherein the second snubber comprises a plurality of second snubber segments circumferentially spaced apart from each other.

9. The roller bearing arrangement of claim 1, wherein the first snubber is a continuous extension having a circumferential extent of 360 degrees.

10. The roller bearing arrangement of claim 1, wherein the first snubber comprises a plurality of first snubber segments circumferentially spaced apart from each other.

11. The roller bearing arrangement of claim 1, further comprising an inner race at least partially disposed on the first axial bearing surface and an outer race at least partially disposed on the second axial bearing surface, wherein the plurality of roller bearing elements is at least partially received between the inner race and the outer race.

12. The roller bearing arrangement of claim 1, wherein the stub shaft comprises a plurality of scallops on the radially inner surface of the stub shaft and a plurality of channels fluidly communicating the plurality of scallops with the first axial bearing surface, wherein each scallop is configured receive a lubricant from a lubricant supply, and wherein each channel is configured to supply the lubricant to the first axial bearing surface.

13. A gas turbine engine for an aircraft, the gas turbine engine including the roller bearing arrangement of claim 1.

* * * * *